US010917812B2

(12) United States Patent
Chen et al.

(10) Patent No.: US 10,917,812 B2
(45) Date of Patent: Feb. 9, 2021

(54) QOS GUARANTEE METHOD AND GATEWAY

(71) Applicant: HUAWEI TECHNOLOGIES CO., LTD., Guangdong (CN)

(72) Inventors: Zhongping Chen, Shanghai (CN); Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/991,935

(22) Filed: May 29, 2018

(65) Prior Publication Data
US 2018/0279161 A1 Sep. 27, 2018

Related U.S. Application Data

(63) Continuation of application No. PCT/CN2015/097700, filed on Dec. 17, 2015.

(51) Int. Cl.
*H04W 28/02* (2009.01)
*H04W 28/16* (2009.01)
*H04M 15/00* (2006.01)
*H04L 12/14* (2006.01)
*H04W 4/24* (2018.01)
(Continued)

(52) U.S. Cl.
CPC ......... *H04W 28/0268* (2013.01); *H04L 12/14* (2013.01); *H04L 12/1407* (2013.01); *H04M 15/64* (2013.01); *H04M 15/65* (2013.01); *H04M 15/66* (2013.01); *H04W 4/24* (2013.01); *H04W 28/16* (2013.01); *H04W 28/20* (2013.01);
(Continued)

(58) Field of Classification Search
CPC . H04W 28/0268; H04W 72/10; H04W 88/16; H04W 28/20; H04W 28/24
USPC .......................................................... 370/235
See application file for complete search history.

(56) References Cited

U.S. PATENT DOCUMENTS 9,055,557 B1 * 6/2015 Bayar .................... H04M 15/41
2006/0160533 A1 * 7/2006 Chou .................... H04W 28/18
455/422.1

(Continued)

FOREIGN PATENT DOCUMENTS

CN 102811204 A 12/2012
CN 104349400 A 2/2015
(Continued)

OTHER PUBLICATIONS

Extended European Search Report issued in European Application No. 151910538.6 dated Oct. 9, 2018, 8 pages.
(Continued)

*Primary Examiner* — Jae Y Lee
*Assistant Examiner* — Jean F Voltaire
(74) *Attorney, Agent, or Firm* — Fish & Richardson P.C.

(57) ABSTRACT

The present disclosure relates to a QoS guarantee method. In one example method, a control plane gateway obtains a QoS parameter. The QoS parameter comprises an allocation/retention priority (ARP) and a QoS class identifier (QCI). The control plane gateway maps the QoS parameter to QoS guarantee information. The QoS guarantee information comprises a differentiated services code point (DSCP) parameter. The control plane gateway sends the QoS guarantee information to a user plane gateway. The QoS guarantee information is to be used by the user plane gateway for QoS marking.

18 Claims, 10 Drawing Sheets

(51) Int. Cl.
- *H04W 28/20* (2009.01)
- *H04W 28/24* (2009.01)
- *H04W 72/10* (2009.01)
- *H04W 88/16* (2009.01)

(52) U.S. Cl.
CPC .......... *H04W 28/24* (2013.01); *H04W 72/10* (2013.01); *H04W 88/16* (2013.01)

(56) References Cited

U.S. PATENT DOCUMENTS

| | | | |
|---|---|---|---|
| 2008/0089324 A1* | 4/2008 | Polk | H04L 65/80 370/389 |
| 2009/0016282 A1* | 1/2009 | Gasparroni | H04L 45/24 370/329 |
| 2010/0046369 A1* | 2/2010 | Zhao | H04W 28/24 370/232 |
| 2010/0110989 A1* | 5/2010 | Wu | H04L 47/27 370/328 |
| 2012/0155298 A1 | 6/2012 | Yang et al. | |
| 2012/0209978 A1* | 8/2012 | Cho | H04W 60/04 709/223 |
| 2016/0105899 A1* | 4/2016 | Zhou | H04W 28/24 370/329 |
| 2018/0115873 A1* | 4/2018 | Aminaka | H04W 72/02 |

FOREIGN PATENT DOCUMENTS

| | | |
|---|---|---|
| EP | 2999261 A1 | 3/2016 |
| WO | 2014110410 A1 | 7/2014 |
| WO | 2014190197 A1 | 11/2014 |
| WO | 2015010469 A1 | 1/2015 |
| WO | 2015160329 A1 | 10/2015 |

OTHER PUBLICATIONS

3GPP TR 23.714 V0.2.0 (Nov. 2015);3rd Generation Partnership Project;Technical Specification Group Services and System Aspects;Study on control and user plane separation of EPC nodes(Release 14),total 24 pages.

OpenFlow Switch Specification,Version 1.2 (Wire Protocol 0x03),Dec. 5, 2011,total 85 pages.

3GPP TS 23.401 V13.5.0 (Dec. 2015);3rd Generation Partnership Project;Technical Specification Group Services and System Aspects;General Packet Radio Service (GPRS) enhancements for Evolved Universal Terrestrial Radio Access Network (E-UTRAN) access(Release 13),total 337 pages.

3GPP TS 23.203 V13.6.0 (Dec. 2015);3rd Generation Partnership Project;Technical Specification Group Services and System Aspects;Policy and charging control architecture(Release 13),total 242 pages.

3GPP TS 23.261 V12.0.0 (Sep. 2014);3rd Generation Partnership Project;Technical Specification Group Services and System Aspects;IP flow mobility and seamless Wireless Local Area Network (WLAN) offload;Stage 2(Release 12),total 22 pages.

International Search Report issued in International Application No. PCT/CN2015/097700 dated Aug. 29, 2016, 6 pages.

Office Action issued in Chinese Application No. 201580079646.6 dated Sep. 3, 2019, 6 pages.

EPO Communication pursuant to Article 94(3) EPC issued in European Application No. 15910538.6 on Dec. 1, 2020, 5 pages.

* cited by examiner

QOS GUARANTEE METHOD AND GATEWAY

CROSS-REFERENCE TO RELATED APPLICATIONS

This application is a continuation of International Application No. PCT/CN2015/097700, filed on Dec. 17, 2015, the disclosure of which is hereby incorporated by reference in its entirety.

TECHNICAL FIELD

The present disclosure relates to the field of communications technologies, and in particular, to a quality of service QoS guarantee method and a gateway.

BACKGROUND

In an evolved packet core (EPC), a service flow may be aggregated into a bearer, and the bearer is aggregated into a packet data network (PDN) connection (that is, a session) to provide QoS guarantee.

In an existing EPC, a data forwarding layer and a data control layer are separated by using an Open Flow protocol, and packet forwarding is implemented by using an Open Flow technology. However, a problem is that in the prior art, only a packet on an Internet Protocol (IP) layer can be processed, and packet forwarding is implemented according to a processing result, and corresponding quality of service (QoS) guarantee cannot be provided for user equipment.

SUMMARY

Embodiments of the present disclosure provide a QoS guarantee method and a gateway, so as to provide corresponding QoS guarantee for user equipment.

According to a first aspect of the embodiments of the present disclosure, a quality of service QoS guarantee method is provided, where the method is applied to an evolved packet core EPC, the EPC includes a control plane gateway and at least two user plane gateways, and the method includes:

obtaining, by the control plane gateway, a quality of service QoS parameter;

mapping, by the control plane gateway, the QoS parameter to QoS guarantee information, where a mapping relationship between the QoS parameter and the QoS guarantee information is configured on the control plane gateway; and sending, by the control plane gateway, the QoS guarantee information to the user plane gateway, to instruct the user plane gateway to provide QoS guarantee for the user equipment according to the QoS guarantee information.

In this solution, the control plane gateway may obtain the QoS parameter, and map the QoS parameter to the QoS guarantee information that is required by the user plane gateway to provide the QoS guarantee for the user equipment; and then may instruct, by interacting with the user plane gateway, the user plane gateway to provide the QoS guarantee for the user equipment according to the QoS guarantee information. That is, corresponding QoS guarantee may be provided for the user equipment by using this solution.

In addition, in this solution, the EPC includes a control plane gateway and at least two user plane gateways. Therefore, when the mapping relationship between the QoS parameter and the QoS guarantee information changes, only a mapping relationship configured on one control plane gateway needs to be updated. This simplifies an updating process.

With reference to the first aspect, in a first possible implementation, the QoS guarantee includes bandwidth guarantee, and the bandwidth guarantee includes session-level bandwidth guarantee, bearer-level bandwidth guarantee, and service-flow-level bandwidth guarantee.

With reference to the first possible implementation, in a second possible implementation, the QoS guarantee information includes a bandwidth guarantee parameter;

the bandwidth guarantee parameter includes a traffic policing parameter or a traffic shaping parameter, the traffic policing parameter is used to perform traffic policing on a rate of user traffic entering a network, and the traffic shaping parameter is used to perform traffic shaping on a rate of user traffic flowing out of the network;

the traffic policing parameter includes a committed information rate CIR, a committed burst size CBS, a peak information rate PIR, and a peak burst size PBS; and the traffic shaping parameter includes a rate and a queue depth, the rate is a preset maximum allowed rate of packet transmission, and the queue depth is used to represent a maximum quantity of packets that can be buffered by each user equipment.

With reference to the second possible implementation, in a third possible implementation, the QoS parameter includes: a maximum bit rate MBR or a guaranteed bit rate GBR, and a per APN aggregate maximum bit rate APN-AMBR; and the mapping, by the control plane gateway, the QoS parameter to QoS guarantee information includes:

mapping, by the control plane gateway, the GBR to the CIR and the CBS, and mapping the APN-AMBR to the PIR and the PBS; or mapping, by the control plane gateway, the MBR to the rate and the queue depth.

In this solution, the QoS guarantee provided by the user plane gateway for the user equipment may be specifically the bandwidth guarantee. That is, the user plane gateway may provide bandwidth guarantee for the user equipment, to avoid impact of network congestion on data transmission of the user equipment, so as to ensure normal data transmission of the user equipment.

With reference to the second possible implementation or the third possible implementation, in a fourth possible implementation, the bandwidth guarantee parameter further includes first feature information; and the first feature information includes a feature of a packet on which the bandwidth guarantee is to be performed, and is used to instruct the user plane gateway to perform the bandwidth guarantee on a packet including the feature.

With reference to the fourth possible implementation, in a fifth possible implementation, the first feature information includes an Internet Protocol IP address of the user equipment, and is used to instruct the user plane gateway to perform the bandwidth guarantee on a packet including the IP address of the user equipment; or the first feature information includes the IP address of the user equipment and a tunnel endpoint identifier TEID, and is used to instruct the user plane gateway to perform the bandwidth guarantee on a packet including the IP address of the user equipment and the TEID; or the first feature information includes the IP address of the user equipment and a traffic flow template TFT, and is used to instruct the user plane gateway to perform the bandwidth guarantee on a packet including the IP address of the user equipment and the TFT; or the first feature information includes the TEID, and is used to instruct the user plane gateway to perform the bandwidth guarantee on a packet including the TEID; or the first feature information includes an IP 5-tuple, and is used to instruct the user plane gateway to perform the bandwidth guarantee on a packet including the IP 5-tuple.

In this solution, the first feature information includes the feature of the packet on which the bandwidth guarantee is to be performed, so as to instruct the user plane gateway to pertinently perform the bandwidth guarantee on a specific packet (a packet carrying the feature included in the first feature information). This can effectively limit a range on which the bandwidth guarantee is to be performed.

With reference to the fourth possible implementation or the fifth possible implementation, in a sixth possible implementation, the first feature information is further used to instruct the user plane gateway to perform the session-level bandwidth guarantee, the bearer-level bandwidth guarantee, or the service-flow-level bandwidth guarantee; and when including the IP address of the user equipment, the first feature information is used to instruct the user plane gateway to perform the session-level bandwidth guarantee on the packet including the IP address of the user equipment; or when including the IP address of the user equipment and the TEID, the first feature information is used to instruct the user plane gateway to perform the session-level bandwidth guarantee on the packet including the IP address of the user equipment and the TEID; or when including the IP address of the user equipment and the TFT, the first feature information is used to instruct the user plane gateway to perform the session-level bandwidth guarantee on the packet including the IP address of the user equipment and the TFT; or when including the TEID, the first feature information is used to instruct the user plane gateway to perform the bearer-level bandwidth guarantee on the packet including the TEID; or when including the IP 5-tuple, the first feature information is used to instruct the user plane gateway to perform the service-flow-level bandwidth guarantee on the packet including the IP 5-tuple.

In this solution, in addition to including the feature of the packet on which the bandwidth guarantee is to be performed, the first feature information is used to indicate a level of bandwidth guarantee to be performed by the user plane gateway (that is, specific guarantee to be performed: the session-level bandwidth guarantee, the bearer-level bandwidth guarantee, or the service-flow-level bandwidth guarantee). In this way, the user plane gateway may be instructed to pertinently perform bandwidth guarantee at a particular level (for example, the session-level bandwidth guarantee, the bearer-level bandwidth guarantee, or the service-flow-level bandwidth guarantee) on a specific packet (a packet that carries the feature included in the first feature information). The bandwidth guarantee is classified into the session-level bandwidth guarantee, the bearer-level bandwidth guarantee, and the service-flow-level bandwidth guarantee according to a service flow granularity. Therefore, this solution may not only effectively limit a range on which the bandwidth guarantee is to be performed, but may also specifically limit a granularity based on which the bandwidth guarantee is to be performed.

With reference to the first aspect, in a seventh possible implementation, the QoS guarantee includes QoS re-marking, and the QoS re-marking includes bearer-level QoS re-marking and service-flow-level QoS re-marking.

With reference to the seventh possible implementation, in an eighth possible implementation, the QoS guarantee information includes a differentiated services code point DSCP parameter, and the QoS parameter includes an allocation/retention priority ARP and a QoS class identifier QCI.

With reference to the seventh possible implementation or the eighth possible implementation, in a ninth possible implementation, the QoS guarantee information further includes second feature information; where the second feature information includes a feature of a packet on which the QoS re-marking is to be performed, and is used to instruct the user plane gateway to perform the QoS re-marking on a packet including the feature.

With reference to the ninth possible implementation, in a tenth possible implementation, the second feature information includes a TEID, and is used to instruct the user plane gateway to perform the QoS re-marking on a packet including the TEID; or the second feature information includes an IP 5-tuple, and is used to instruct the user plane gateway to perform the QoS re-marking on a packet including the IP 5-tuple.

In this solution, the second feature information includes the feature of the packet on which the QoS re-marking is to be performed, so as to instruct the user plane gateway to pertinently perform the QoS re-marking on a specific packet (a packet carrying the feature included in the second feature information). This can effectively limit a range on which the QoS re-marking is performed.

With reference to the ninth possible implementation or the tenth possible implementation, in an eleventh possible implementation, the second feature information is further used to indicate that to-be-performed QoS re-marking is the bearer-level QoS re-marking or the service-flow-level QoS re-marking; and when including the TEID, the second feature information is used to instruct the user plane gateway to perform the bearer-level QoS re-marking on the packet including the TEID; or when including the IP 5-tuple, the second feature information is used to instruct the user plane gateway to perform the service-flow-level QoS re-marking on the packet including the IP 5-tuple.

In this solution, in addition to including the feature of the packet on which the QoS re-marking is to be performed, the second feature information is used to indicate a level of QoS re-marking to be performed by the user plane gateway (that is, specific guarantee to be performed: the bearer-level QoS re-marking or the service-flow-level QoS re-marking). In this way, the user plane gateway may be instructed to pertinently perform QoS re-marking at a particular level (for example, the bearer-level QoS re-marking or the service-flow-level QoS re-marking) on a specific packet (a packet that carries the feature included in the second feature information). The QoS re-marking is classified into the bearer-level QoS re-marking or the service-flow-level QoS re-marking according to a service flow granularity. Therefore, this solution may not only effectively limit a range on which the QoS re-marking is to be performed, but may also specifically limit a granularity based on which the QoS re-marking is to be performed.

With reference to the first aspect, in a twelfth possible implementation, the QoS guarantee further includes bearer-level tunnel marking.

With reference to the twelfth possible implementation, in a thirteenth possible implementation, the second feature information includes a TEID, and is used to instruct the user plane gateway to perform the bearer-level tunnel marking on a packet including the TEID.

With reference to any one of the first aspect, or the foregoing possible implementations of the first aspect, in a fourteenth possible implementation, the obtaining, by the control plane gateway, a quality of service QoS parameter includes:

obtaining, by the control plane gateway, the QoS parameter according to access information and subscription information of the user equipment;

or performing, by the control gateway, deep packet inspection DPI on a packet of the user equipment to obtain the QoS parameter.

With reference to any one of the first aspect, or the foregoing possible implementations of the first aspect, in a fifteenth possible implementation, before the sending, by the control plane gateway, the QoS guarantee information to the user plane gateway, to instruct the user plane gateway to provide QoS guarantee for the user equipment according to the QoS guarantee information, the method further includes:

sending, by the control plane gateway, an object creation request message to the user plane gateway, where the object creation request message carries a user service context when the user equipment accesses the EPC, and the user service context includes a session context, a bearer context, and a service flow context, to instruct the user plane gateway to create at least one of a session object, a bearer object, or a service flow object for the user equipment according to the user service context; where one session context is associated with one or more bearer contexts, or one session context is associated with one or more service flow contexts; and one bearer context is associated with one or more service flow contexts.

Providing the QoS guarantee for the user equipment by instructing the user plane gateway to create a corresponding object is a specific implementation of providing the QoS guarantee for the user equipment. The control plane gateway may instruct, as required and based on a specific application and scenario, the user plane gateway to configure a corresponding object. This may improve programmability and scalability of the user plane gateway. In addition, after the object is instantiated, the object configured on the user plane gateway may receive, according to control performed by the control plane gateway on the object, a specific packet belonging to the object, and processes the received packet according to action orchestration of the control plane gateway.

With reference to any one of the first aspect, or the foregoing possible implementations of the first aspect, in a sixteenth possible implementation, the method further includes:

after the mapping relationship between the QoS parameter and the QoS guarantee information changes, updating, by the control plane gateway, the mapping relationship.

In this solution, the EPC includes a control plane gateway and at least two user plane gateways. Therefore, when the mapping relationship between the QoS parameter and the QoS guarantee information changes, only a mapping relationship configured on one control plane gateway needs to be updated. This simplifies an updating process.

With reference to the sixteenth possible implementation, in a seventeenth possible implementation, after the updating, by the control plane gateway, the mapping relationship, the method further includes:

mapping, by the control plane gateway, the QoS parameter to updated QoS guarantee information by using an updated mapping relationship; and sending, by the control plane gateway, the updated QoS guarantee information to the user plane gateway, to instruct the user plane gateway to provide QoS guarantee for the user equipment according to the updated QoS guarantee information.

With reference to any one of the first aspect, or the foregoing possible implementations of the first aspect, in an eighteenth possible implementation, after the sending, by the control plane gateway, the QoS guarantee information to the user plane gateway, the method further includes:

sending, by the control plane gateway, a QoS guarantee termination message to the user plane gateway, where the QoS guarantee termination message is used to instruct the user plane gateway to terminate providing the QoS guarantee for the user equipment.

According to a second aspect of the embodiments of the present disclosure, a control plane gateway is provided, where the control plane gateway is included in an evolved packet core EPC, the EPC further includes at least two user plane gateways, and the control plane gateway includes:

an obtaining unit, configured to obtain a quality of service QoS parameter;

a mapping unit, configured to map the QoS parameter obtained by the obtaining unit to QoS guarantee information, where a mapping relationship between the QoS parameter and the QoS guarantee information is configured on the control plane gateway; and a sending unit, configured to send the QoS guarantee information to the user plane gateway, to instruct the user plane gateway to provide QoS guarantee for the user equipment according to the QoS guarantee information.

With reference to the second aspect, in a first possible implementation, the QoS guarantee includes bandwidth guarantee, and the bandwidth guarantee includes session-level bandwidth guarantee, bearer-level bandwidth guarantee, and service-flow-level bandwidth guarantee.

With reference to the first possible implementation, in a second possible implementation, the QoS guarantee information includes a bandwidth guarantee parameter;

the bandwidth guarantee parameter includes a traffic policing parameter or a traffic shaping parameter, the traffic policing parameter is used to perform traffic policing on a rate of user traffic entering a network, and the traffic shaping parameter is used to perform traffic shaping on a rate of user traffic flowing out of the network;

the traffic policing parameter includes a committed information rate CIR, a committed burst size CBS, a peak information rate PIR, and a peak burst size PBS; and the traffic shaping parameter includes a rate and a queue depth, the rate is a preset maximum allowed rate of packet transmission, and the queue depth is used to represent a maximum quantity of packets that can be buffered by each user equipment.

With reference to the second possible implementation, in a third possible implementation, the QoS parameter includes: a maximum bit rate MBR or a guaranteed bit rate GBR, and a per APN aggregate maximum bit rate APN-AMBR; and the mapping unit is specifically configured to:

map the GBR to the CIR and the CBS, and map the APN-AMBR to the PIR and the PBS; or map the MBR to the rate and the queue depth.

With reference to the second possible implementation or the third possible implementation, in a fourth possible implementation, the bandwidth guarantee parameter further includes first feature information; and the first feature information includes a feature of a packet on which the bandwidth guarantee is to be performed, and is used to instruct the user plane gateway to perform the bandwidth guarantee on a packet including the feature.

With reference to the fourth possible implementation, for detailed description about the first feature information in a fifth possible implementation, refer to related description in the fifth possible implementation of the first aspect of the embodiments of the present disclosure, and details are not described again in this embodiment.

With reference to the fourth possible implementation or the fifth possible implementation, in a sixth possible implementation, the first feature information is further used to instruct the user plane gateway to perform the session-level bandwidth guarantee, the bearer-level bandwidth guarantee, or the service-flow-level bandwidth guarantee.

It should be noted that, for a specific method in which the first feature information is used to instruct the user plane gateway to perform the session-level bandwidth guarantee, the bearer-level bandwidth guarantee, or the service-flow-level bandwidth guarantee, refer to related description in the sixth possible implementation of the first aspect of the embodiments of the present disclosure, and details are not described again in this embodiment.

With reference to the second aspect, in a seventh possible implementation, the QoS guarantee includes QoS re-marking, and the QoS re-marking includes bearer-level QoS re-marking and service-flow-level QoS re-marking.

With reference to the seventh possible implementation, in an eighth possible implementation, the QoS guarantee information includes a differentiated services code point DSCP parameter, and the QoS parameter includes an allocation/retention priority ARP and a QoS class identifier QCI.

With reference to the seventh possible implementation or the eighth possible implementation, in a ninth possible implementation, the QoS guarantee information further includes second feature information; where the second feature information includes a feature of a packet on which the QoS re-marking is to be performed, and is used to instruct the user plane gateway to perform the QoS re-marking on a packet including the feature.

With reference to the ninth possible implementation, for detailed description about the second feature information in a tenth possible implementation, refer to related description in the tenth possible implementation of the first aspect of the embodiments of the present disclosure, and details are not described again in this embodiment.

With reference to the ninth possible implementation or the tenth possible implementation, in an eleventh possible implementation, the second feature information is further used to indicate that to-be-performed QoS re-marking is the bearer-level QoS re-marking or the service-flow-level QoS re-marking.

It should be noted that, for a specific method in which the first feature information is used to indicate that the to-be-performed QoS re-marking is the bearer-level QoS re-marking or the service-flow-level QoS re-marking, refer to related description in the eleventh possible implementation of the first aspect of the embodiments of the present disclosure, and details are not described again in this embodiment.

With reference to the second aspect, in a twelfth possible implementation, the QoS guarantee further includes bearer-level tunnel marking.

When the QoS guarantee is the bearer-level tunnel marking, the second feature information includes a TEID, and is used to instruct the user plane gateway to perform the bearer-level tunnel marking on a packet including the TEID.

With reference to any one of the second aspect, or the foregoing possible implementations of the second aspect, in a thirteenth possible implementation, the obtaining unit is specifically configured to:

obtain the QoS parameter according to access information and subscription information of the user equipment;

or perform deep packet inspection DPI on a packet of the user equipment to obtain the QoS parameter.

With reference to any one of the second aspect, or the foregoing possible implementations of the second aspect, in a fourteenth possible implementation, the sending unit is further configured to: before sending the QoS guarantee information to the user plane gateway, to instruct the user plane gateway to provide the QoS guarantee for the user equipment according to the QoS guarantee information, send an object creation request message to the user plane gateway, where the object creation request message carries a user service context when the user equipment accesses the EPC, and the user service context includes a session context, a bearer context, and a service flow context, to instruct the user plane gateway to create at least one of a session object, a bearer object, or a service flow object for the user equipment according to the user service context; where one session context is associated with one or more bearer contexts, or one session context is associated with one or more service flow contexts; and one bearer context is associated with one or more service flow contexts.

With reference to any one of the second aspect, or the foregoing possible implementations of the second aspect, in a fifteenth possible implementation, the control plane gateway further includes:

an updating unit, configured to: after a mapping relationship between a QoS parameter and the QoS guarantee information changes, update the mapping relationship.

With reference to the fifteenth possible implementation, in a sixteenth possible implementation, the mapping unit is further configured to map the QoS parameter to updated QoS guarantee information by using a mapping relationship updated by the updating unit; and the sending unit is further configured to send the QoS guarantee information updated by the updating unit to the user plane gateway, to instruct the user plane gateway to provide QoS guarantee for the user equipment according to the updated QoS guarantee information.

With reference to any one of the second aspect, or the foregoing possible implementations of the second aspect, in a seventeenth possible implementation, the sending unit is further configured to: after sending the QoS guarantee information to the user plane gateway, send a QoS guarantee termination message to the user plane gateway, where the QoS guarantee termination message is used to instruct the user plane gateway to terminate providing the QoS guarantee for the user equipment.

According to a third aspect of the embodiments of the present disclosure, a control plane gateway is provided, including a processor, a memory, a system bus, and a communications interface, where the memory is configured to store a computer executable instruction; the processor is connected to the memory by using the system bus; and when the control plane gateway runs, the processor executes the computer executable instruction stored in the memory, so that the control plane gateway performs the QoS guarantee method according to any one of the first aspect or the foregoing possible implementations of the first aspect of the present disclosure.

According to a fourth aspect of the embodiments of the present disclosure, a readable medium is provided, where the readable medium includes a computer executable instruction, and when a processor of a control plane gateway executes the computer executable instruction, the control plane gateway performs the QoS guarantee method according to any one of the first aspect or the foregoing possible implementations of the first aspect of the embodiments of the present disclosure.

It should be noted that, for a technical effect of the control plane gateway provided in the second aspect or the third aspect of the embodiments of the present disclosure, reference may be made to a technical effect of the QoS guarantee method according to any one of the first aspect or the foregoing possible implementations of the first aspect of the embodiments of the present disclosure, and details are not described herein again.

According to a fifth aspect of the embodiments of the present disclosure, a quality of service QoS guarantee method is provided, where the method is applied to an evolved packet core EPC, the EPC includes a control plane gateway and at least two user plane gateways, and the method includes:

receiving, by the user plane gateway, QoS guarantee information sent by the control plane gateway; and providing, by the user plane gateway, QoS guarantee for the user equipment according to the QoS guarantee information.

In this solution, the user plane gateway may provide the QoS guarantee for the user equipment according to the QoS guarantee information sent by the control plane gateway. That is, corresponding QoS guarantee may be provided for the user equipment by using this solution.

In addition, in this solution, the EPC includes a control plane gateway and at least two user plane gateways. Therefore, when the mapping relationship between the QoS parameter and the QoS guarantee information changes, only a mapping relationship configured on one control plane gateway needs to be updated. This simplifies an updating process.

With reference to the fifth aspect, in a first possible implementation, the QoS guarantee includes bandwidth guarantee, and the bandwidth guarantee includes session-level bandwidth guarantee, bearer-level bandwidth guarantee, and service-flow-level bandwidth guarantee, or the QoS guarantee includes QoS re-marking, and the QoS re-marking includes bearer-level QoS re-marking and service-flow-level QoS re-marking; or the QoS guarantee includes bearer-level tunnel marking.

It should be noted that, for detailed description about the QoS guarantee information in the fifth aspect and a possible implementation of the fifth aspect of the embodiments of the present disclosure, reference may be made to related description in the first aspect or the first possible implementation of the first aspect, and details are not described herein again.

When the QoS guarantee is the QoS re-marking, the QoS guarantee information is a DSCP parameter; and the providing, by the user plane gateway, QoS guarantee for the user equipment according to the QoS guarantee information specifically includes: when forwarding, by the user plane gateway, uplink data or downlink data forwarding, modifying a DSCP field of an IP packet to a DSCP parameter.

When the QoS guarantee is the bearer-level tunnel marking, the providing, by the user plane gateway, QoS guarantee for the user equipment according to the QoS guarantee information specifically includes:

when an uplink packet leaves a general packet radio service GPRS tunneling protocol GTP tunnel, decapsulating, by the user plane gateway, the uplink packet to extract an outer-layer packet DSCP of the uplink packet, and writes the outer-layer packet DSCP of the uplink packet into a packet header of an inner-layer packet of the uplink packet;

when the uplink packet enters a tunnel on a packet data network PDN side, extracting an inner-layer packet DSCP of the uplink packet, and writing the inner-layer packet DSCP of the uplink packet into a packet header of an outer-layer packet of the uplink packet;

when a downlink packet leaves the tunnel on the PDN side, decapsulating the downlink packet to extract an outer-layer packet DSCP of the downlink packet, and writes the outer-layer packet DSCP of the downlink packet into a packet header of an inner-layer packet of the downlink packet; and when the downlink packet enters the GTP tunnel, extracting an inner-layer packet DSCP of the downlink packet, and writing the inner-layer packet DSCP of the downlink packet into a packet header of the outer-layer packet of the downlink packet.

According to a sixth aspect of the embodiments of the present disclosure, a user plane gateway is provided, where the user plane gateway is included in an evolved packet core EPC, and the EPC further includes at least two user plane gateways; and the user plane gateway includes function modules configured to perform the QoS guarantee method according to various possible implementations of the fifth aspect and the fifth aspect, and these function modules are obtained, by logically dividing the user plane gateway, to perform the QoS guarantee method according to the foregoing possible implementations of the fifth aspect and the fifth aspect.

According to a seventh aspect of the embodiments of the present disclosure, a user plane gateway is provided, including a processor, a memory, a system bus, and a communications interface, where the memory is configured to store a computer executable instruction; the processor is connected to the memory by using the system bus; and when the user plane gateway runs, the processor executes the computer executable instruction stored in the memory, so that the user plane gateway performs the QoS guarantee method according to any one of the fifth aspect or the foregoing possible implementations of the fifth aspect of the present disclosure.

According to an eighth aspect of the embodiments of the present disclosure, a readable medium is provided, where the readable medium includes a computer executable instruction, and when a processor of a user plane gateway executes the computer executable instruction, the user plane gateway performs the QoS guarantee method according to any one of the fifth aspect or the foregoing possible implementations of the fifth aspect of the present disclosure.

It should be noted that, for a technical effect of the user plane gateway provided in the sixth aspect or the seventh aspect of the embodiments of the present disclosure, reference may be made to a technical effect of the QoS guarantee method according to any one of the fourth aspect or the foregoing possible implementations of the fourth aspect of the embodiments of the present disclosure, and details are not described herein again.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
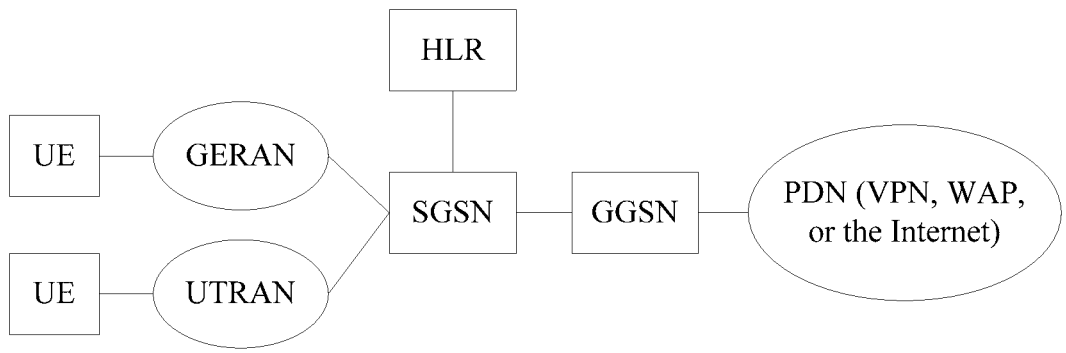
FIG. 1 is a schematic diagram of a network architecture of a wireless communications system according to an embodiment of the present disclosure.

Various technologies in this specification may be applied to a wireless communications system in a 3rd Generation Partnership Project (3GPP) standard. As shown in FIG. 1, the wireless communications system includes a universal terrestrial radio access network (UTRAN) and a GSM/EDGE radio access network (GERAN). The UTRAN usually includes a plurality of radio network controllers (RNC) and a radio transmission node NodeB, configured to implement a radio access function in a universal mobile terrestrial service (UMTS) network. The GERAN usually includes a plurality of base stations and base station controllers (BSC), configured to implement a radio access function in a general packet radio service (GPRS) network.

As shown in FIG. 1, the wireless communications system further includes a serving general packet radio service support node (SGSN), a gateway general packet radio service support node (GGSN), and a home location register (HLR). The SGSN is configured to implement functions such as routing and forwarding, mobility management, session management, and user information storage in a GPRS/UMTS network. The GGSN is configured to connect to an external PDN. The PDN may be the Internet, a virtual private network (VPN), an IP multimedia service (IMS) network, or a Wireless Application Protocol (WAP) network provided by an operator. The HLR is configured to store subscription information and authentication data of a user about a network service.

Figure 2:
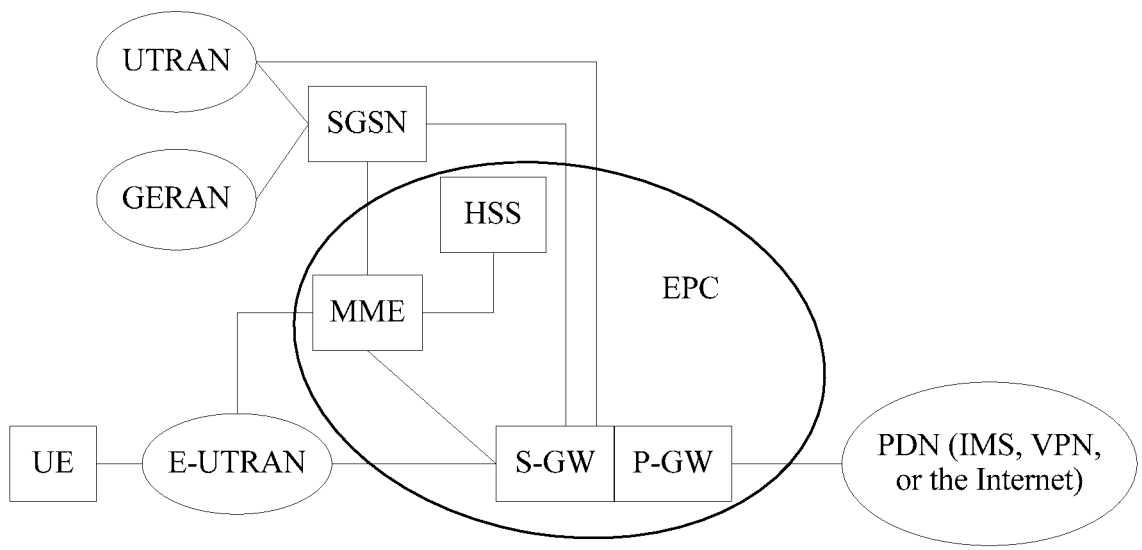
FIG. 2 is a schematic diagram of a network architecture of another wireless communications system according to an embodiment of the present disclosure.

As shown in FIG. 2, the communications system applied to this embodiment of the present disclosure may further include an evolved universal terrestrial radio access network (E-UTRAN) and an EPC. Core network devices in the EPC mainly include a mobility management entity (MME), a serving gateway (S-GW), a packet data network gateway (P-GW), and a home subscriber server (HSS). The E-UTRAN is configured to implement all functions related to a wireless access section of an evolved network. The MME is responsible for control plane mobility management, including user context management and mobile status management, allocating a temporary mobile subscriber identity (TMSI), and the like. The S-GW is a user plane anchor between 3GPP access networks, and terminates an E-TURAN interface. The P-GW is an interface between a user plane anchor and a PDN, where the interface is between a 3GPP access network and a non-3GPP access network. The HSS is configured to store subscription information of a user. The MME, the S-GW, the P-GW, and the HSS are usually used as network elements of the core network.

The S-GW, the P-GW, and the GGSN are basically the same in a platform architecture, and therefore are collectively referred to as a gateway. In this embodiment of the present disclosure, a control plane and a user plane of a gateway are separated. A gateway control plane entity (GW-C) may be referred to as a control plane gateway, or may be referred to as a gateway controller, a control node, or a control gateway. A gateway user plane entity (GW-U) may be referred to as a user plane gateway, or may be referred to as a packet data forwarding gateway, a routing and forwarding node, or a switching node.

Figure 3:
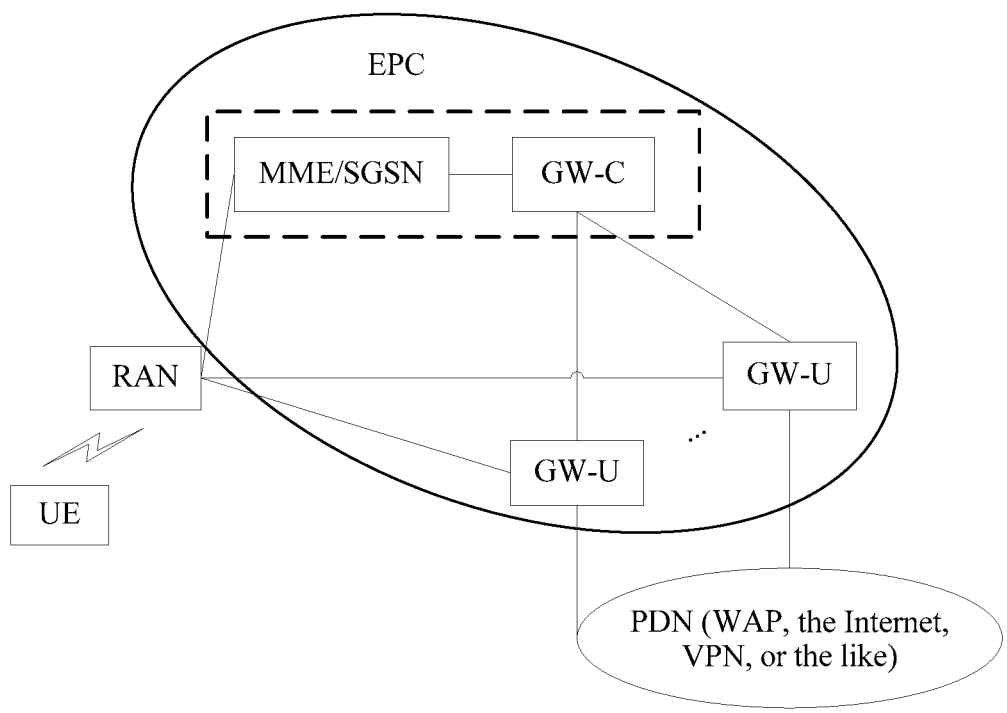
FIG. 3 is a schematic diagram of a network architecture of another wireless communications system according to an embodiment of the present disclosure.

As shown in FIG. 3, FIG. 3 is a schematic diagram of a network architecture applied to a QoS guarantee method is applied according to an embodiment of the present disclosure. As shown in FIG. 3, the EPC may include a control plane gateway (denoted as a GW-C) and at least two user plane gateways (denoted as a GW-U). As shown in FIG. 3, in this embodiment of the present disclosure, considering that both the control plane gateway and the MME/SGSN use a universal computing platform, the control plane gateway and the MME/SGSN may be co-located.

With reference to the accompanying drawings, the following describes in detail, based on specific embodiments and application scenarios of the embodiments, a QoS guarantee method and a gateway provided in the embodiments of the present disclosure.

Embodiment 1

Figure 4:
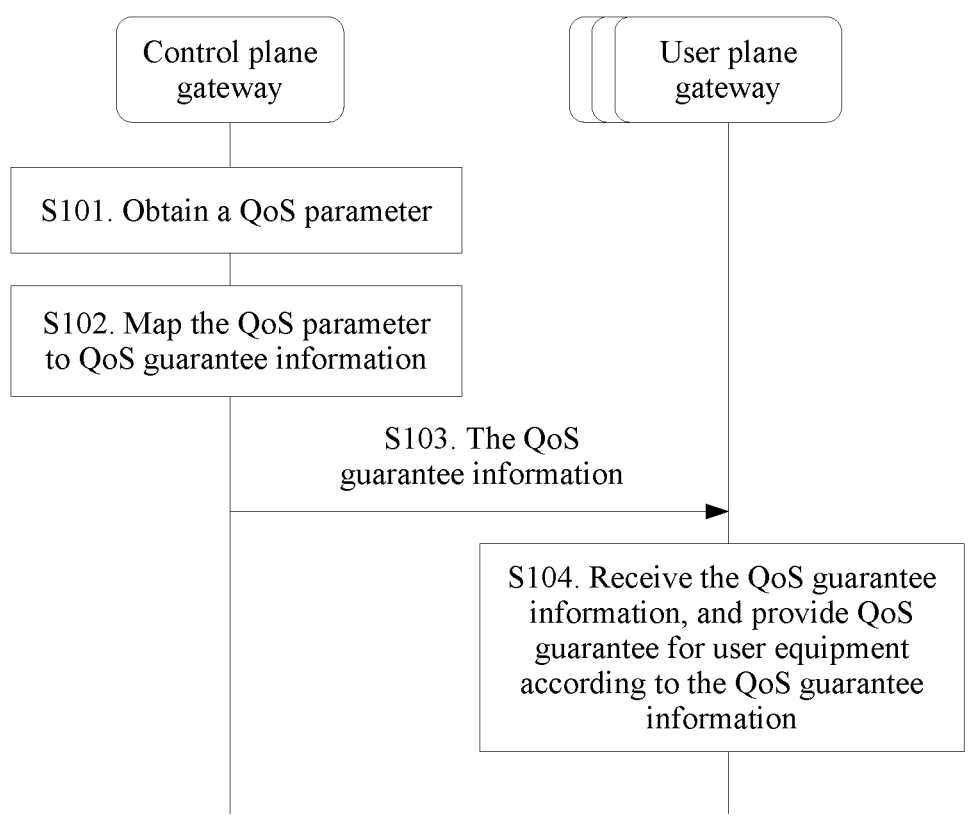
FIG. 4 is a flowchart of a QoS guarantee method according to an embodiment of the present disclosure.

An embodiment of the present disclosure provides a QoS guarantee method. An EPC includes a control plane gateway and at least two user plane gateways. As shown in FIG. 4, the method includes the following steps.

S101. The control plane gateway obtains a QoS parameter.

For example, a method in which the control plane gateway obtains the QoS parameter may include: obtaining, by the control plane gateway, the QoS parameter according to access information and subscription information that are of user equipment; or performing, by the control gateway, deep packet inspection (DPI) on a packet of the user equipment to obtain the QoS parameter.

The access information of the user equipment may include information about a current access network of the user equipment, for example, a radio access type (RAT) of the current access network. The RAT is used to indicate that the current access network of the user equipment is a 2G network, a 3G network, or a 4G network. The subscription information of the user equipment is mainly QoS subscription information included in account subscription data of the user equipment, for example, a per APN aggregate maximum bit rate (APNAMBR) and a QoS class identifier (QCI). QoS subscription information may vary with a radio access type.

S102. The control plane gateway maps the QoS parameter to QoS guarantee information.

A mapping relationship between the QoS parameter and the QoS guarantee information is configured on the control plane gateway. The control plane gateway may map the QoS parameter to the QoS guarantee information according to the mapping relationship configured on the control plane gateway.

In this embodiment of the present disclosure, the EPC includes a control plane gateway and at least two user plane gateways. That is, in this embodiment of the present disclosure, one control plane gateway may control at least two user plane gateways. In this way, when the mapping relationship between a QoS parameter and the QoS guarantee information changes, only a mapping relationship configured on one control plane gateway needs to be updated. Compared with the prior art in which mapping relationships configured on a plurality of control plane gateways need to be separately updated, the updating method in this solution is simpler and more convenient.

S103. The control plane gateway sends the QoS guarantee information to a user plane gateway.

S104. The user plane gateway receives the QoS guarantee information, and provides QoS guarantee for user equipment according to the QoS guarantee information.

For example, the QoS guarantee in this embodiment of the present disclosure may include bandwidth guarantee and QoS re-marking. The bandwidth guarantee may be classified into session-level bandwidth guarantee, bearer-level bandwidth guarantee, and service-flow-level bandwidth guarantee according to a service granularity. The QoS re-marking may be classified into bearer-level QoS re-marking and service-flow-level QoS re-marking according to the service granularity.

It should be noted that the control plane gateway and the user plane gateway in this embodiment of the present disclosure communicate with each other by using an S18 interface.

According to the QoS guarantee method provided in this embodiment of the present disclosure, the control plane gateway may obtain the QoS parameter, and map the QoS parameter to the QoS guarantee information that is required by the user plane gateway to provide the QoS guarantee for the user equipment; and then may instruct, by interacting with the user plane gateway, the user plane gateway to provide the QoS guarantee for the user equipment according to the QoS guarantee information. That is, corresponding QoS guarantee may be provided for the user equipment by using this solution.

In addition, in this solution, the EPC includes a control plane gateway and at least two user plane gateways. Therefore, when the mapping relationship between the QoS parameter and the QoS guarantee information changes, only a mapping relationship configured on one control plane gateway needs to be updated. This simplifies an updating process.

Further, in this embodiment of the present disclosure, the foregoing bandwidth guarantee may be implemented in an object-oriented manner. Specifically, the user plane gateway may separately create at least one of a session object, a bearer object, or a service flow object according to a granularity of the bandwidth guarantee, and provide the QoS guarantee for the user equipment by using the session object, the bearer object, or the service flow object.

Specifically, before S103, the method in this embodiment of the present disclosure may further include: sending, by the control plane gateway, an object creation request message to the user plane gateway, where the object creation request message carries a user service context when the user equipment accesses the EPC; and receiving, by the user plane gateway, the object creation request message sent by the control plane gateway, and creating at least one of the session object, the bearer object, or the service flow object for the user equipment according to the user service context carried in the object creation request message. Correspondingly, S104 may be specifically as follows: The user plane gateway receives the QoS guarantee information, and provides, according to the QoS guarantee information, the QoS guarantee for the user equipment by using the session object, the bearer object, or the service flow object.

The user service context includes at least one of a session context, a bearer context, or a service flow context. The object creation request message is used to instruct the user plane gateway to create the at least one of the session object, the bearer object, or the service flow object for the user equipment according to the user service context. The session context, the bearer context, and the service flow context are associated with each other. Specifically, one session context is associated with one or more bearer contexts, or one session context is associated with one or more service flow contexts; and one bearer context is associated with one or more service flow contexts.

The object in this embodiment of the present disclosure is an abstract expression of a type of entity that has a specific function and attribute. The object needs to be instantiated before being used, so as to endow the object with a corresponding attribute and a related action to be performed. An attribute of the object is used to describe a feature of the object, and an action of the object is used to describe a function of the object. In this embodiment of the present disclosure, the control plane gateway may designate an attribute and a specific action of the object for the user plane gateway.

Any one of an IP address of the user equipment, a Media Access Control (MAC) address of the user equipment, or a Generic Routing Encapsulation (GRE) key may be used as an attribute of the session object. Both an IP address/MAC address of each user equipment and each GRE key may be uniquely corresponding to one session object. Both a tunnel endpoint identifier (TEID) and a traffic flow template (TFT) may be used as attributes of the bearer object. Both one group of TEIDs and one TFT may be uniquely corresponding to one bearer object. An IP 5-tuple of a packet may be used as an attribute of the service flow object. A specific 5-tuple may be uniquely corresponding to one service flow object.

The action of the object may include bandwidth guarantee and QoS re-marking. The bandwidth guarantee may include traffic policing or traffic shaping. Specifically, for detailed description about the traffic policing, the traffic shaping, and the QoS re-marking, refer to subsequent description in this embodiment of the present disclosure, and details are not described herein again.

Certainly, the action of the object includes but is not limited to the foregoing actions. For example, the action of the object may further include QoS marking. For other details about the action of the object, refer to related description in the prior art, and details are not described herein again.

In this solution, the control plane gateway may instruct, as required and based on a specific application and scenario, the user plane gateway to configure a corresponding object. This may improve programmability and scalability of the user plane gateway. In addition, after the object is instantiated, the object configured on the user plane gateway may receive, according to control performed by the control plane gateway on the object, a specific packet belonging to the object, and processes the received packet according to action orchestration of the control plane gateway.

Embodiment 2

An embodiment of the present disclosure provides a QoS guarantee method. An EPC includes a control plane gateway and at least two user plane gateways. In this embodiment, that the QoS guarantee is specifically bandwidth guarantee, that is, the control plane gateway instructs the user plane gateway to provide the bandwidth guarantee for user equipment is used as an example to describe in detail the QoS guarantee method provided in this embodiment of the present disclosure.

Figure 5:
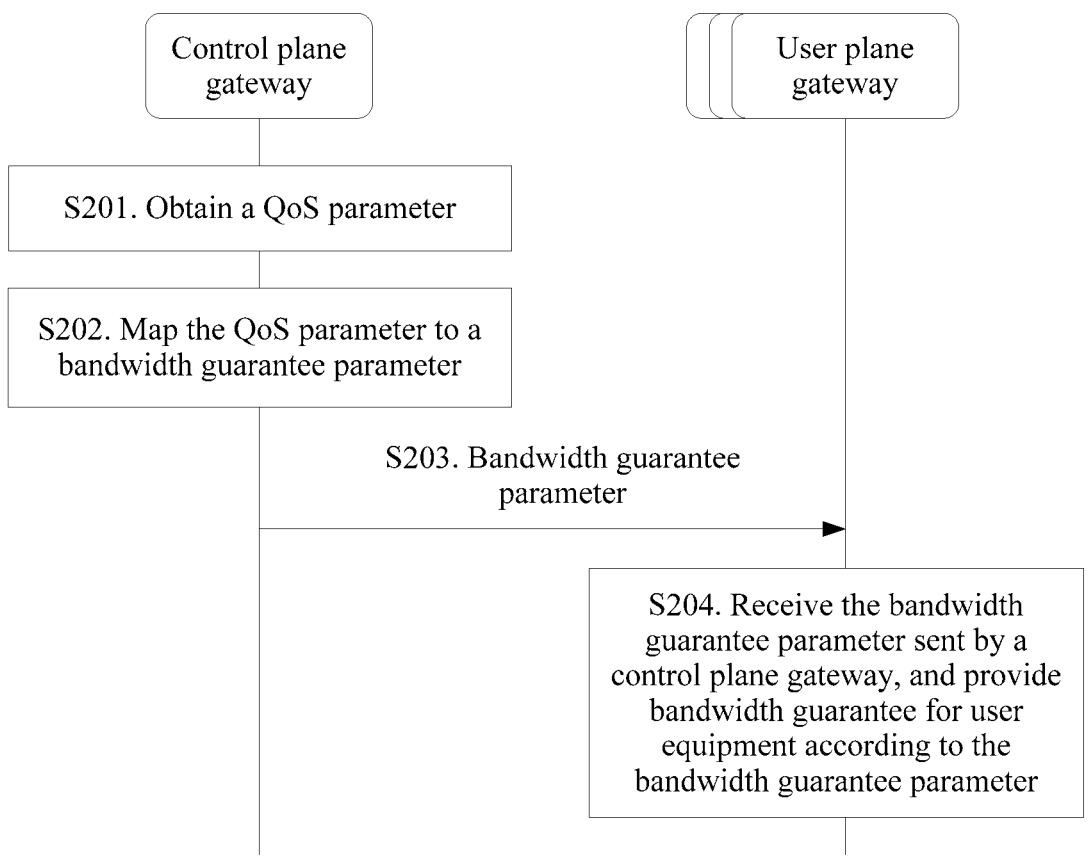
FIG. 5 is a flowchart of another QoS guarantee method according to an embodiment of the present disclosure.

In this embodiment, the QoS guarantee information is specifically a bandwidth guarantee parameter. As shown in FIG. 5, the QoS guarantee method includes the following steps.

S201. The control plane gateway obtains a QoS parameter.

For example, the QoS parameter in this embodiment may include: a maximum bit rate (MBR), a guaranteed bit rate (GBR), and a per APN-AMBR.

The GBR is used to represent a minimum bit rate that is of a bear and that is guaranteed by the system. Even when network resources are in shortage, a corresponding bit rate can be maintained. The MBR defines a rate upper limit that a GBR bear can reach when sufficient resources are available. The APN-AMBR is used to represent a maximum aggregate bit rate of all non-GBR bearers in all PDN connections on an access point (APN). The non-GBR bearer is a bearer for which bandwidth guarantee is not configured.

It should be noted that, for a method in which the control plane gateway obtains the QoS parameter, refer to related description in Embodiment 1 of the present disclosure, and details are not described again in this embodiment.

S202. The control plane gateway maps the QoS parameter to a bandwidth guarantee parameter.

A method in which the control plane gateway maps the QoS parameter to the bandwidth guarantee parameter may specifically include: mapping, by the control plane gateway, the GBR to a CIR and a CBS, mapping the APN-AMBR to a PIR and a PBS, and mapping the MBR to a rate and a queue depth.

The bandwidth guarantee parameter in this embodiment of the present disclosure may include a traffic policing parameter or a traffic shaping parameter.

The traffic policing parameter is used to perform traffic policing (TP) on a rate of user traffic entering a network, to ensure a committed access rate (CAR), that is, the rate of the user traffic entering the network is limited within an agreed range, so as to avoid network congestion.

For example, the traffic policing parameter may include a committed information rate (CIR), a committed burst size (CBS), a peak information rate (PIR), and a peak burst size (PBS).

The traffic shaping parameter is used to perform traffic shaping (TS) on a rate of user traffic flowing out of the network, to adjust the rate of the user traffic flowing out of the network, so that the user traffic (include a packet) is sent at a relatively constant speed. The traffic shaping may usually be implemented by using a buffer and a token bucket. Specifically, when a sending speed of a packet is excessively high, the packet is first buffered in a buffer, and then buffered packets are sent at a constant speed under control of the token bucket.

For example, the traffic shaping parameter may include a rate and a queue depth. The rate is usually planned and provided by an operator, and is used to represent a maximum allowed rate of packet transmission. The queue depth is used to represent a maximum quantity of packets that can be buffered by each user equipment.

In this embodiment of the present disclosure, the bandwidth guarantee may be classified into three levels according to a granularity of a service flow: session-level bandwidth guarantee, bearer-level bandwidth guarantee, and service-flow-level bandwidth guarantee. At least one bearer converges in one session, and at least one service flow converges in one bearer.

It should be noted that the control plane gateway may implement the foregoing mapping according to a mapping relationship configured on the control plane gateway. A specific mapping method is not described again in this embodiment.

S203. The control plane gateway sends the bandwidth guarantee parameter to a user plane gateway.

S204. The user plane gateway receives the bandwidth guarantee parameter sent by the control plane gateway, and provides bandwidth guarantee for user equipment according to the bandwidth guarantee parameter.

It should be noted that in this embodiment of the present disclosure, for a method in which the user plane gateway provides bandwidth guarantee for user equipment according to the bandwidth guarantee parameter, refer to a related prior-art method in which the user plane gateway provides bandwidth guarantee for user equipment according to the bandwidth guarantee parameter, and details are not described again in this embodiment of the present disclosure.

Preferably, to specify a range in which the user plane gateway performs the foregoing bandwidth guarantee, that is, a packet on which the user plane gateway needs to perform the foregoing bandwidth guarantee, the bandwidth guarantee parameter may further include first feature information. The first feature information includes a feature of a packet on which the bandwidth guarantee is to be performed, and is used to instruct the user plane gateway to perform the bandwidth guarantee on a packet including the feature.

For example, a specific manner in which the first feature information is used to instruct the user plane gateway to perform the bandwidth guarantee on a packet indicated by the feature in the first feature information may include the following cases:

If the first feature information includes an IP address of the user equipment, the first feature information may be used to instruct the user plane gateway to perform the bandwidth guarantee on a packet including the IP address of the user equipment;

if the first feature information includes the IP address of the user equipment and a TEID, the first feature information may be used to instruct the user plane gateway to perform the bandwidth guarantee on a packet including both the IP address of the user equipment and the TEID;

if the first feature information includes the IP address of the user equipment and a TFT, the first feature information may be used to instruct the user plane gateway to perform the bandwidth guarantee on a packet including both the IP address of the user equipment and the TFT;

if the first feature information includes the TEID, the first feature information may be used to instruct the user plane gateway to perform the bandwidth guarantee on a packet including the TEID; and if the first feature information includes an IP 5-tuple, the first feature information may be used to instruct the user plane gateway to perform the bandwidth guarantee on a packet including the IP 5-tuple.

Further, the first feature information in this embodiment of the present disclosure may be used to indicate a level of to-be-performed bandwidth guarantee, and the level of the to-be-performed bandwidth guarantee includes a session level, a bearer level, and a service flow level.

For example, a specific manner in which the first feature information indicates the level of the to-be-performed bandwidth guarantee may include the following cases:

If the first feature information includes the IP address of the user equipment, the first feature information may be used to instruct the user plane gateway to perform the session-level bandwidth guarantee on the packet including the IP address of the user equipment;

if the first feature information includes the IP address of the user equipment and the TEID, the first feature information may be used to instruct the user plane gateway to perform the session-level bandwidth guarantee on the packet including both the IP address of the user equipment and the TEID;

if the first feature information includes the IP address of the user equipment and the TFT, the first feature information may be used to instruct the user plane gateway to perform the session-level bandwidth guarantee on the packet including both the IP address of the user equipment and the TFT;

if the first feature information includes the TEID, the first feature information may be used to instruct the user plane gateway to perform the bearer-level bandwidth guarantee on the packet including the TEID; and if the first feature information includes the IP 5-tuple, the first feature information is used to instruct the user plane gateway to perform the service-flow-level bandwidth guarantee on the packet including the IP 5-tuple.

Optionally, when bandwidth guarantee is the service-flow-level bandwidth guarantee, before S204, the method in this embodiment of the present disclosure may further include: sending, by the control plane gateway, a service flow traffic threshold to the user plane gateway; receiving, by the user plane gateway, the service flow traffic threshold sent by the control plane gateway; monitoring, by the user plane gateway, whether an accumulated traffic of the user equipment exceeds a first traffic threshold; and if the accumulated traffic of the user equipment exceeds the first traffic threshold, sending, by the user plane gateway, the accumulated traffic of the user equipment to the control plane gateway, and indicating that locally accumulated traffic of the user equipment exceeds the service flow traffic threshold. The control plane gateway may map the GBR to the CIR and the CBS according to the accumulated traffic of the user equipment.

For example, a method in which the control plane gateway maps the GBR to the CIR and the CBS according to the accumulated traffic of the user equipment may include: when the GBR is mapped to the CIR and the CBS, increasing, by the control plane gateway, the CIR and the CBS according to a traffic value that is obtained by deducting a second traffic threshold from the accumulated traffic of the user equipment. In the control plane gateway, the foregoing traffic value and adjustment granularities of the CIR and the CBS, or a correspondence between the foregoing traffic value and adjustment granularities of the CIR and the CBS may be pre-configured. The second traffic threshold is less than the first traffic threshold.

Figure 6:
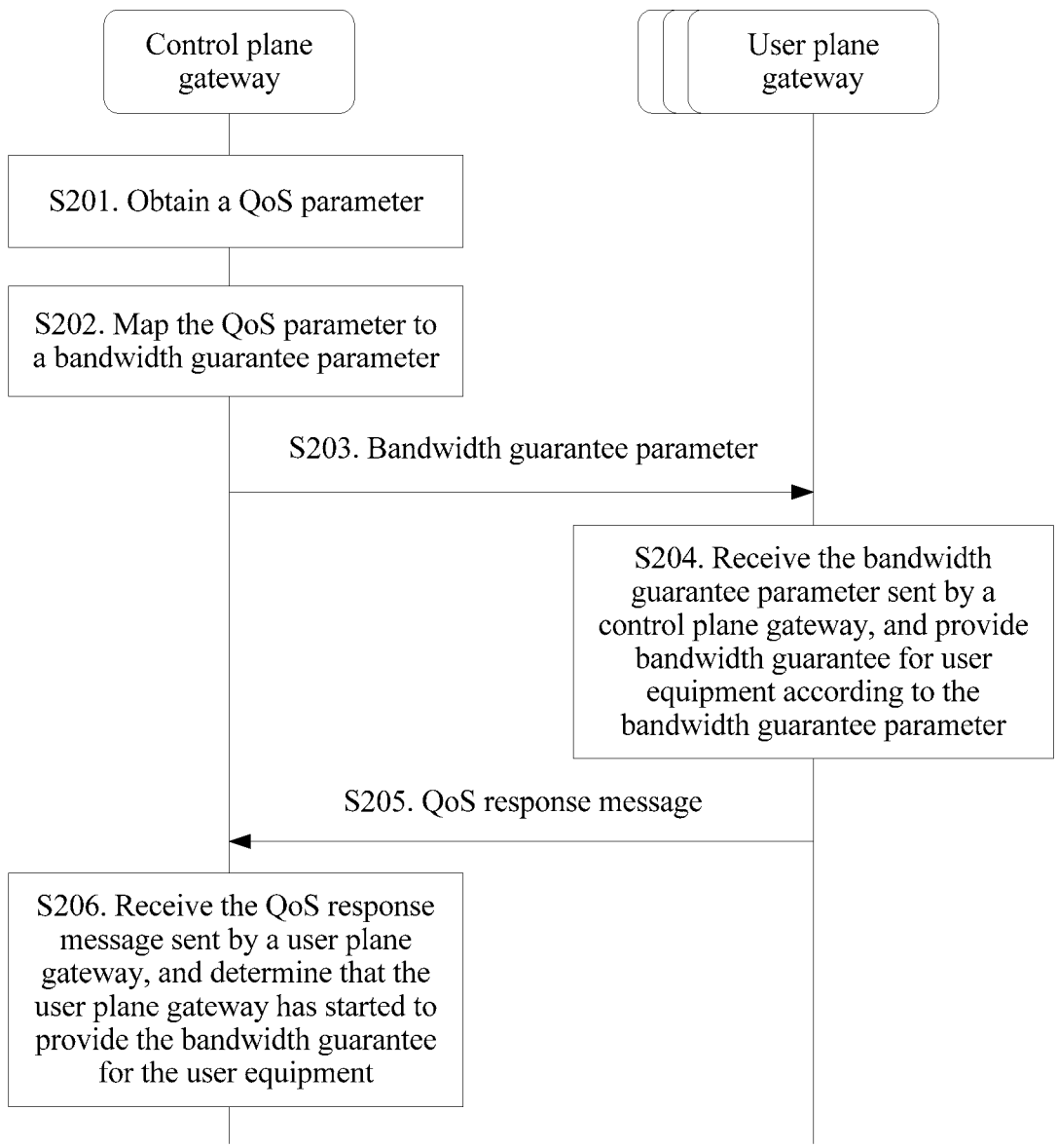
FIG. 6 is a flowchart of another QoS guarantee method according to an embodiment of the present disclosure.

Further, as shown in FIG. 6, after the user plane gateway provides the QoS guarantee (that is, S202) for the user equipment, the method in this embodiment of the present disclosure may include S205 and S206.

S205. The user plane gateway sends a QoS response message to the control plane gateway, where the QoS response message is used to indicate the user plane gateway determines to provide the bandwidth guarantee for the user equipment.

S206. The control plane gateway receives the QoS response message sent by the user plane gateway, and determines that the user plane gateway has started to provide the bandwidth guarantee for the user equipment.

It may be appreciated that after receiving the QoS response message sent by the user plane gateway, the control plane gateway may determine that the user plane gateway has started to provide the bandwidth guarantee for the user equipment.

Further, a mapping relationship between a QoS parameter and QoS guarantee information may change, and therefore, the control plane gateway needs to update a stored mapping relationship in time. Specifically, as shown in FIG. 7, the method in this embodiment of the present disclosure may further include S207.

S207. After a mapping relationship between a QoS parameter and the bandwidth guarantee parameter changes, the control plane gateway updates the mapping relationship.

In this solution, the EPC includes a control plane gateway and at least two user plane gateways. Therefore, when the mapping relationship between the QoS parameter and the bandwidth guarantee parameter changes, only a mapping relationship configured on one control plane gateway needs to be updated. Compared with the prior art in which mapping relationships configured on a plurality of control plane gateways need to be separately updated, the updating method in this solution is simpler and more convenient.

Figure 7:
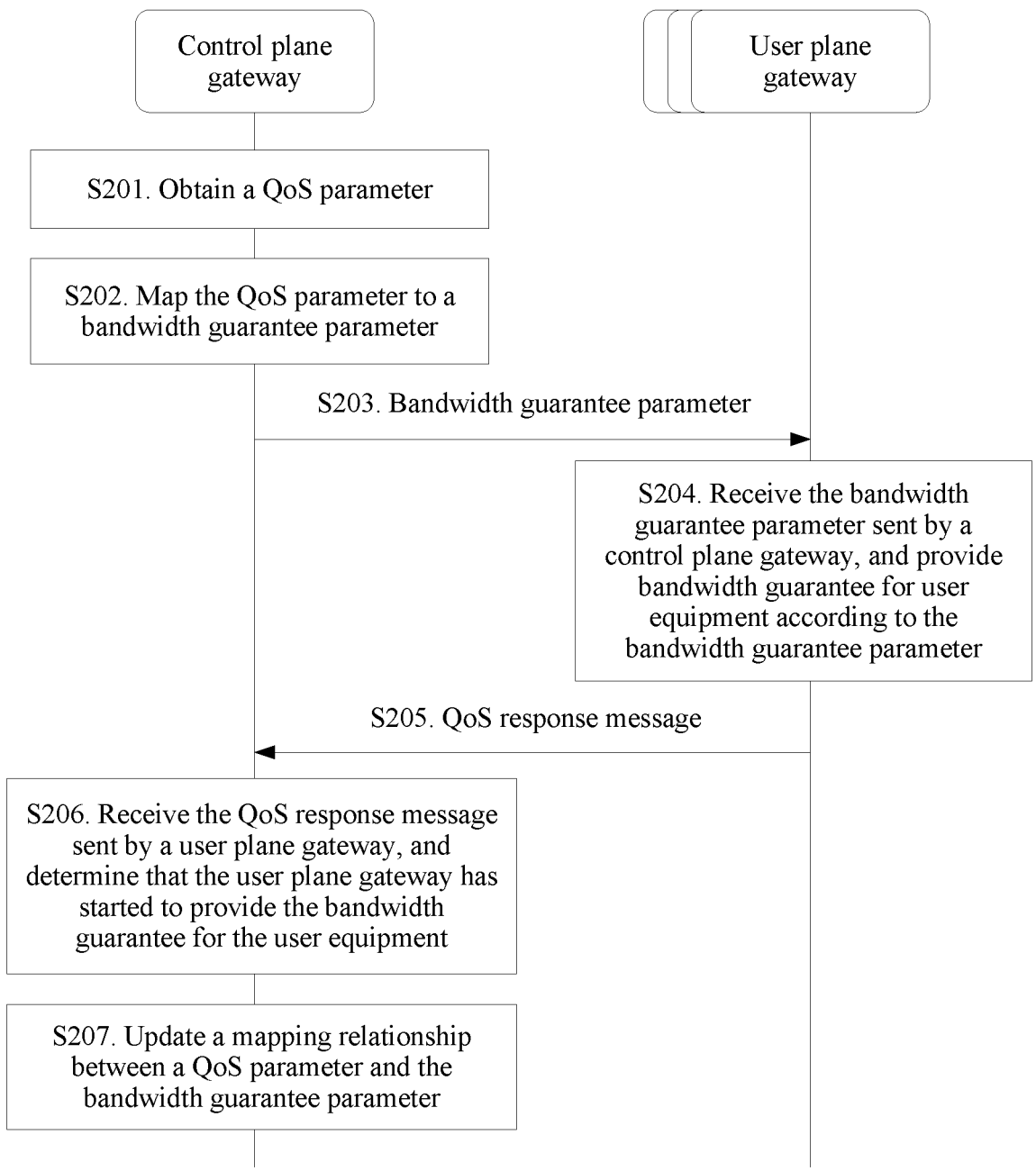
FIG. 7 is a flowchart of another QoS guarantee method according to an embodiment of the present disclosure.

Further, to ensure that the user plane gateway may provide the QoS guarantee for the user equipment according to an updated bandwidth guarantee parameter, as shown in FIG. 7, the method in this embodiment of the present disclosure may include S208.

S208. The control plane gateway maps the QoS parameter to the updated bandwidth guarantee parameter by using an updated mapping relationship.

Correspondingly, S203 may be replaced with S203', and S204 may be replaced with S204'.

S203'. The user plane gateway receives the bandwidth guarantee parameter sent by the control plane gateway, and provides the bandwidth guarantee for the user equipment according to the bandwidth guarantee parameter.

S204'. The user plane gateway provides the bandwidth guarantee for the user equipment according to the updated bandwidth guarantee parameter.

Further, the user plane gateway may terminate providing the QoS guarantee for the user equipment according to an instruction of the control plane gateway. Specifically, the method in this embodiment of the present disclosure may further include: sending, by the control plane gateway, a QoS guarantee termination message to the user plane gateway, where the QoS guarantee termination message is used to instruct the user plane gateway to terminate providing the bandwidth guarantee for the user equipment.

In this solution, the control plane gateway may obtain the QoS parameter, and map the QoS parameter to the bandwidth guarantee parameter that is required by the user plane gateway to provide the bandwidth guarantee for the user equipment; and then may instruct, by interacting with the user plane gateway, the user plane gateway to perform bandwidth guarantee at different granularities for different packets according to the bandwidth guarantee parameter. That is, bandwidth guarantee at different granularities may be provided for different user equipments by using this solution. In addition, an updating process of a mapping relationship configured on the control plane gateway may be simplified when a mapping relationship between the QoS parameter and the bandwidth guarantee parameter changes.

Optionally, in this embodiment of the present disclosure, the foregoing bandwidth guarantee may be implemented in an object-oriented manner. For a specific method in which the control plane gateway instructs the user plane gateway to create an object (at least one of the session object, the bearer object, or the service flow object), refer to related description in Embodiment 1 of the present disclosure, and details are not described again in this embodiment.

In this embodiment, an action of the object is specifically the bandwidth guarantee (including traffic policing or traffic shaping). The control plane gateway may indicate, by using first feature information and to the user plane gateway, an attribute of the object and a granularity of the bandwidth guarantee (action) to be performed by the control plane gateway. For a specific manner in which the control plane gateway indicates, by using the first feature information and to the user plane gateway, the attribute of the object and the granularity of the bandwidth guarantee (action) to be performed by the control plane gateway, refer to the foregoing related description in this embodiment, and details are not described herein again.

In this solution, the control plane gateway may instruct, as required and based on a specific application and scenario, the user plane gateway to configure a corresponding object. This may improve programmability and scalability of the user plane gateway. In addition, after the object is instantiated, the object configured on the user plane gateway may receive, according to control performed by the control plane gateway on the object, a specific packet belonging to the object, and processes the received packet according to action orchestration of the control plane gateway.

Embodiment 3

An embodiment of the present disclosure provides a QoS guarantee method. An EPC includes a control plane gateway and at least two user plane gateways. In this embodiment, that the QoS guarantee is specifically QoS re-marking is used as an example to describe in detail the QoS guarantee method provided in this embodiment of the present disclosure.

Figure 8:
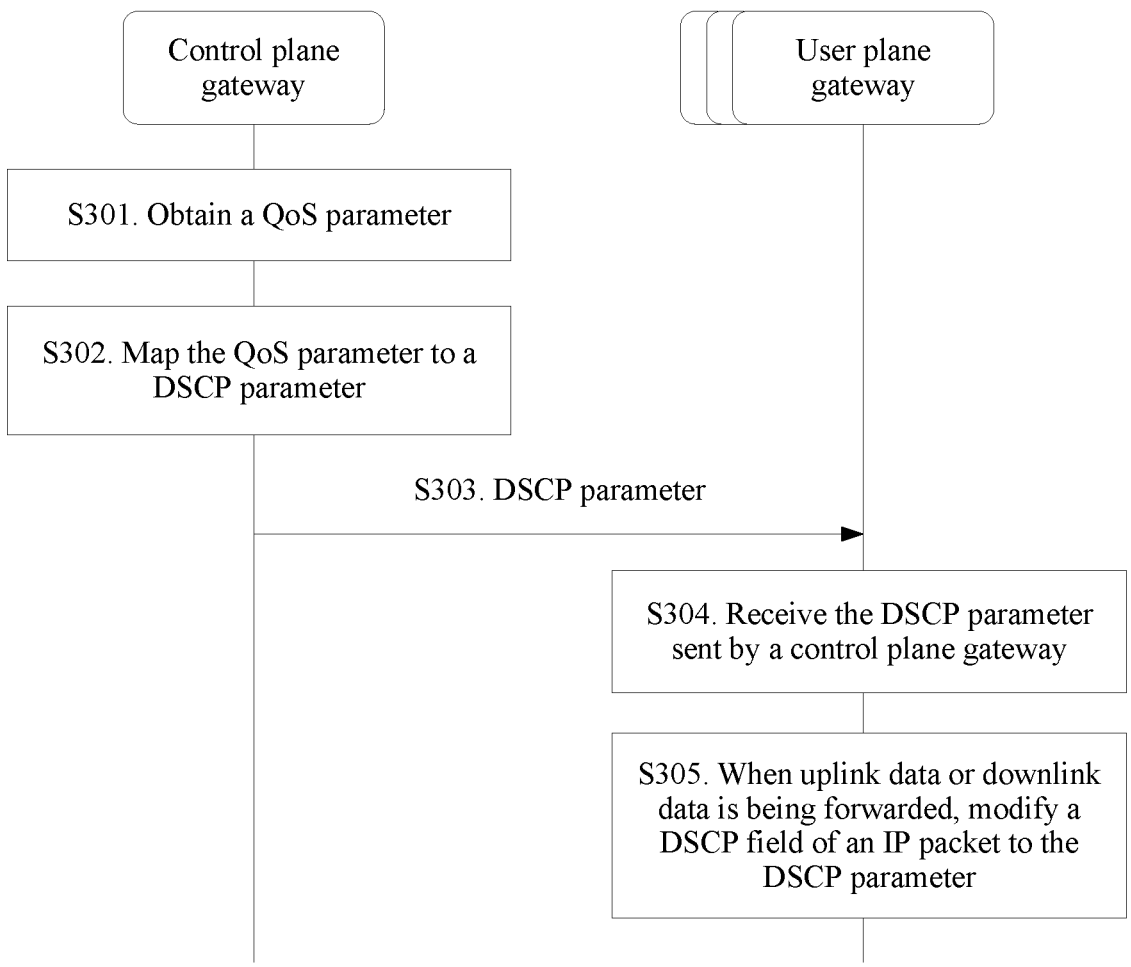
FIG. 8 is a flowchart of another QoS guarantee method according to an embodiment of the present disclosure.

In this embodiment, a QoS guarantee parameter is specifically a differentiated services code point (DSCP) parameter. As shown in FIG. 8, the QoS guarantee method includes the following steps.

S301. A control plane gateway obtains a QoS parameter.

For example, the QoS parameter in this embodiment may include: an allocation/retention priority (ARP) and a QCI.

It should be noted that, for a method in which the control plane gateway obtains the QoS parameter, refer to related description in Embodiment 1 of the present disclosure, and details are not described again in this embodiment.

S302. The control plane gateway maps the QoS parameter to a DSCP parameter.

It should be noted that, for a method in which the control plane gateway maps the QoS parameter to the DSCP parameter, refer to related description in the prior art, and details are not described again in this embodiment.

S303. The control plane gateway sends the DSCP parameter to a user plane gateway.

S304. The user plane gateway receives the DSCP parameter sent by the control plane gateway.

Specifically, in this embodiment, a method in which the user plane gateway provides the QoS guarantee for user equipment may include S305.

S305. When forwarding uplink data or downlink data, the user plane gateway modifies a DSCP field of an IP packet to the DSCP parameter.

Preferably, to specify a range in which the user plane gateway performs the foregoing QoS guarantee (the QoS re-marking), that is, a packet on which the user plane gateway needs to perform the foregoing QoS re-marking, QoS guarantee information further includes second feature information, where the second feature information is used to indicate a feature of a packet on which the QoS re-marking is to be performed.

For example, a specific manner in which the second feature information is used to instruct the user plane gateway to perform the QoS re-marking on a packet indicated by a feature included in the second feature information may include: if the second feature information includes a TEID, instructing the user plane gateway to perform the QoS re-marking on a packet including the TEID; or if the second feature information includes an IP 5-tuple, instructing the user plane gateway to perform the QoS re-marking on a packet including the IP 5-tuple.

Further, the second feature information may be used to indicate that to-be-performed QoS re-marking is bearer-level QoS re-marking or service-flow-level QoS re-marking.

For example, a specific manner in which the second feature information indicates that to-be-performed QoS marking is the bearer-level QoS re-marking or the service-flow-level QoS re-marking may include: if the second feature information includes the TEID, instructing the user plane gateway to perform the bearer-level QoS re-marking on the packet including the TEID; or if the second feature information includes the IP 5-tuple, instructing the user plane gateway to perform the service-flow-level QoS re-marking on the packet including the IP 5-tuple.

Further, after the user plane gateway modifies the DSCP field of the IP packet to the DSCP parameter (that is, S302)

when forwarding the uplink data or downlink data, the method in this embodiment of the present disclosure may include the following step:

S306. The user plane gateway sends a QoS response message to the control plane gateway, where the QoS response message is used to indicate that the user plane gateway determines to provide QoS re-marking for user equipment.

Optionally, in this embodiment of the present disclosure, an object-oriented manner may be used to implement the foregoing bearer-level QoS re-marking. For a specific object creation method, refer to related description in Embodiment 1, and details are not described again in this embodiment of the present disclosure.

Further, in this embodiment, the control plane gateway may also update the mapping relationship after the mapping relationship between the QoS parameter and the DSCP parameter changes.

In this solution, the EPC includes a control plane gateway and at least two user plane gateways. Therefore, when the mapping relationship between the QoS parameter and the DSCP parameter changes, only a mapping relationship configured on one control plane gateway needs to be updated. Compared with the prior art in which mapping relationships configured on a plurality of control plane gateways need to be separately updated, the updating method in this solution is simpler and more convenient.

Further, in this embodiment of the present disclosure, the QoS guarantee may include bearer-level tunnel marking. When including the TEID, the second feature information may be used to instruct the user plane gateway to perform the bearer-level tunnel marking on the packet including the TEID.

In this embodiment of the present disclosure, a specific method in which the user plane gateway provides the bearer-level tunnel marking for the user equipment may include the following steps:

When an uplink packet leaves a GPRS tunneling protocol (GTP) tunnel, the user plane gateway decapsulates the uplink packet to extract an outer-layer packet DSCP of the uplink packet, and writes the outer-layer packet DSCP of the uplink packet into a packet header of an inner-layer packet of the uplink packet;

when the uplink packet enters a tunnel on a PDN side, the user plane gateway extracts an inner-layer packet DSCP of the uplink packet, and writes the inner-layer packet DSCP of the uplink packet into a packet header of an outer-layer packet of the uplink packet;

when a downlink packet leaves the tunnel on the PDN side, the user plane gateway decapsulates the downlink packet to extract an outer-layer packet DSCP of the downlink packet, and writes the outer-layer packet DSCP of the downlink packet into a packet header of an inner-layer packet of the downlink packet; and when the downlink packet enters the GTP tunnel, the user plane gateway extracts an inner-layer packet DSCP of the downlink packet, and writes the inner-layer packet DSCP of the downlink packet into a packet header of the outer-layer packet of the downlink packet.

In this solution, the control plane gateway may obtain the QoS parameter, and map the QoS parameter to the DSCP parameter that is required by the user plane gateway to provide the QoS re-marking for the user equipment; and then may instruct, by interacting with the user plane gateway, the user plane gateway to perform QoS re-marking at different granularities for different packets according to the DSCP parameter. That is, QoS re-marking at different granularities may be provided for different user equipments by using this solution. In addition, an updating process of a mapping relationship configured on the control plane gateway may be simplified when a mapping relationship between the QoS parameter and the DSCP parameter changes.

Optionally, in this embodiment of the present disclosure, an object-oriented manner may be used to provide the QoS re-marking and the bearer-level tunnel marking for the user equipment.

It should be noted that a method for creating a session object, a bearer object, and a service flow object in this embodiment is similar to the method for creating a session object, a bearer object, and a service flow object in Embodiment 1, and details are not described again in this embodiment.

Embodiment 4

Figure 9:
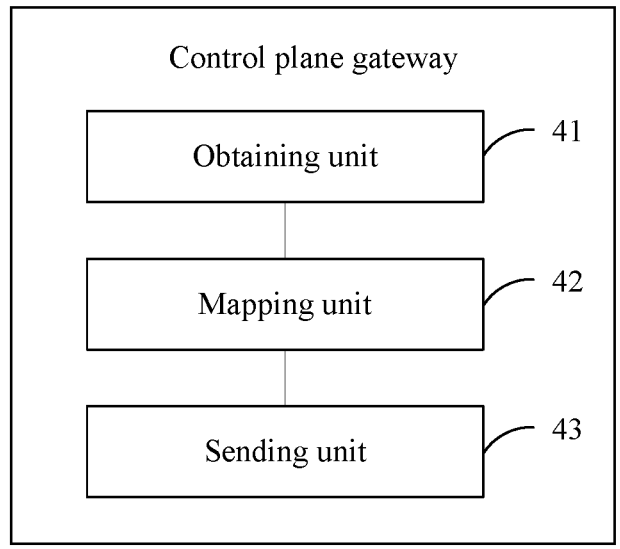
FIG. 9 is a schematic diagram of composition of a control plane gateway according to an embodiment of the present disclosure.

An embodiment of the present disclosure provides a control plane gateway included in an EPC, where the EPC further includes at least two user plane gateways. As shown in FIG. 9, the control plane gateway includes an obtaining unit 41, a mapping unit 42, and a sending unit 43.

The obtaining unit 41 is configured to obtain a quality of service QoS parameter.

The mapping unit 42 is configured to map the QoS parameter obtained by the obtaining unit 41 to QoS guarantee information, where a mapping relationship between the QoS parameter and the QoS guarantee information is configured on the control plane gateway.

The sending unit 43 is configured to send the QoS guarantee information obtained by means of mapping by the mapping unit 42 to the user plane gateway, to instruct the user plane gateway to provide QoS guarantee for the user equipment according to the QoS guarantee information.

Further, in a first application scenario of this embodiment of the present disclosure, the QoS guarantee includes bandwidth guarantee, and the bandwidth guarantee includes session-level bandwidth guarantee, bearer-level bandwidth guarantee, and service-flow-level bandwidth guarantee.

Further, the QoS guarantee information includes a bandwidth guarantee parameter.

The bandwidth guarantee parameter includes a traffic policing parameter or a traffic shaping parameter, the traffic policing parameter is used to perform traffic policing on a rate of user traffic entering a network, and the traffic shaping parameter is used to perform traffic shaping on a rate of user traffic flowing out of the network.

The traffic policing parameter includes a committed information rate CIR, a committed burst size CBS, a peak information rate PIR, and a peak burst size PBS.

The traffic shaping parameter includes a rate and a queue depth, and the queue depth is used to represent a maximum quantity of packets that can be buffered by each user equipment.

Further, the QoS parameter includes a maximum bit rate MBR or a guaranteed bit rate GBR, and a per APN aggregate maximum bit rate APN-AMBR.

The mapping unit 42 is specifically configured to:
map the GBR to the CIR and the CBS, and map the APN-AMBR to the PIR and the PBS; or map the MBR to the rate and the queue depth.

Further, the bandwidth guarantee parameter includes first feature information, where the first feature information includes a feature of a packet on which the bandwidth guarantee is to be performed, and is used to instruct the user plane gateway to perform the bandwidth guarantee on a packet including the feature.

With reference to a fourth possible implementation, for detailed description about the first feature information in a fifth possible implementation, refer to related description in a fifth possible implementation of a first aspect of the embodiments of the present disclosure, and details are not described again in this embodiment.

Further, the first feature information is used to instruct the user plane gateway to perform the session-level bandwidth guarantee, the bearer-level bandwidth guarantee, or the service-flow-level bandwidth guarantee.

It should be noted that, for a specific method in which the first feature information is used to instruct the user plane gateway to perform the session-level bandwidth guarantee, the bearer-level bandwidth guarantee, or the service-flow-level bandwidth guarantee, refer to related description in the method embodiment of the present disclosure, and details are not described again in this embodiment.

Further, in a second application scenario of this embodiment of the present disclosure, the QoS guarantee includes QoS re-marking, and the QoS re-marking includes bearer-level QoS re-marking and service-flow-level QoS re-marking.

Further, the QoS guarantee information includes a differentiated services code point DSCP parameter, and the QoS parameter includes an allocation/retention priority ARP and a QoS class identifier QCI.

Further, the QoS guarantee information further includes second feature information, where the second feature information includes a feature of a packet on which the QoS re-marking is to be performed, and is used to instruct the user plane gateway to perform the QoS re-marking on a packet including the feature.

It should be noted that, for detailed description about the second feature information, refer to related description in the method embodiment of the present disclosure, and details are not described again in this embodiment.

Further, the second feature information is used to indicate that to-be-performed QoS re-marking is the bearer-level QoS re-marking or the service-flow-level QoS re-marking.

It should be noted that, for a specific method in which the second feature information is used to indicate that the to-be-performed QoS re-marking is the bearer-level QoS re-marking or the service-flow-level QoS re-marking, refer to related description in the method embodiment of the present disclosure, and details are not described again in this embodiment.

Further, in a third application scenario of this embodiment of the present disclosure, the QoS guarantee may include bearer-level tunnel marking.

When the QoS guarantee is the bearer-level tunnel marking, the second feature information includes a TEID, and is used to instruct the user plane gateway to perform the bearer-level tunnel marking on a packet including the TEID.

Further, the obtaining unit 41 is specifically configured to:
obtain the QoS parameter according to access information and subscription information of the user equipment;
or
perform deep packet inspection DPI on a packet of the user equipment to obtain the QoS parameter.

Further, the sending unit 43 is configured to: before sending the QoS guarantee information to the user plane gateway, to instruct the user plane gateway to provide the QoS guarantee for the user equipment according to the QoS guarantee information, send an object creation request message to the user plane gateway, where the object creation request message carries a user service context when the user equipment accesses the EPC, and the user service context includes a session context, a bearer context, and a service flow context, to instruct the user plane gateway to create at least one of a session object, a bearer object, or a service flow object for the user equipment according to the user service context.

One session context is associated with one or more bearer contexts, or one session context is associated with one or more service flow contexts; and one bearer context is associated with one or more service flow contexts.

Figure 10:
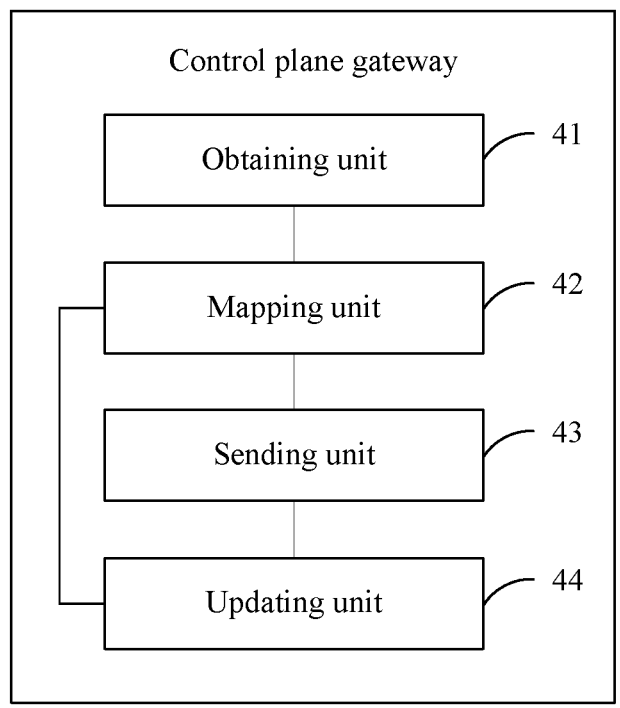
FIG. 10 is a schematic diagram of composition of another control plane gateway according to an embodiment of the present disclosure.

Further, as shown in FIG. 10, the control plane gateway may include an updating unit 44.

The updating unit 44 is configured to: after a mapping relationship between a QoS parameter and the QoS guarantee information changes, update the mapping relationship.

Further, the mapping unit 42 is configured to map the QoS parameter to updated QoS guarantee information by using a mapping relationship updated by the updating unit 44.

The sending unit 43 is further configured to send the QoS guarantee information updated by the updating unit 44 to the user plane gateway, to instruct the user plane gateway to provide QoS guarantee for the user equipment according to the updated QoS guarantee information.

Further, the sending unit 43 is configured to: after sending the QoS guarantee information to the user plane gateway, send a QoS guarantee termination message to the user plane gateway, where the QoS guarantee termination message is used to instruct the user plane gateway to terminate providing the QoS guarantee for the user equipment.

In this solution, the control plane gateway may obtain the QoS parameter, and map the QoS parameter to the QoS guarantee information that is required by the user plane gateway to provide the QoS guarantee for the user equipment; and then may instruct, by interacting with the user plane gateway, the user plane gateway to provide the QoS guarantee for the user equipment according to the QoS guarantee information. That is, corresponding QoS guarantee may be provided for the user equipment by using this solution. In addition, an updating process of a mapping relationship configured on the control plane gateway may be simplified when a mapping relationship between the QoS parameter and the QoS guarantee information changes.

Embodiment 5

Figure 11:
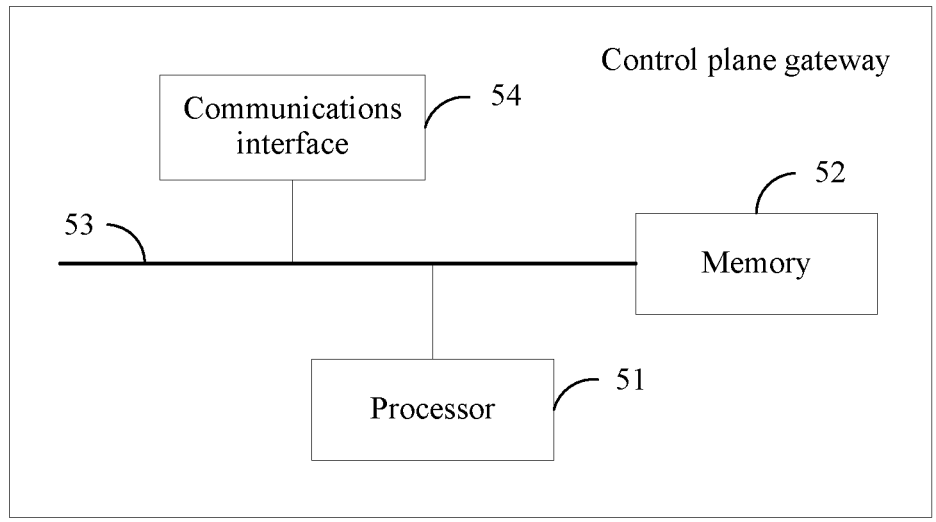
FIG. 11 is a schematic diagram of composition of another control plane gateway according to an embodiment of the present disclosure.

An embodiment of the present disclosure provides a control plane gateway included in an EPC, where the EPC includes a control plane gateway and at least two user plane gateways. As shown in FIG. 11, the control plane gateway includes a processor 51, a memory 52, a system bus 53, and a communications interface 54.

The memory 52 is configured to store a computer executable instruction. The memory 52 is a computer storage medium of the control plane gateway. The computer storage medium may include a high-speed RAM memory, and may further include a non-volatile memory, for example, at least one magnetic disk memory. This embodiment of the present disclosure further provides a readable medium including the foregoing computer executable instruction.

The processor 51 may be a central processing unit (CCPU), or an application-specific integrated circuit (ASIC), or one or more integrated circuits configured to implement this embodiment of the present disclosure.

The processor 51 is connected to the memory 52 by using the system bus 53. When the control plane gateway runs, the processor 51 executes the computer executable instruction stored in the memory 52, so that the control plane gateway performs the QoS guarantee method described in the foregoing embodiment.

It should be noted that the processor 51 in this embodiment of the present disclosure may be an integration of function units (for example, the obtaining unit 41 and a guarantee unit 62) in the foregoing apparatus embodiment, that is, all the foregoing function units may be integrated in the processor 51, and the processor 51 may be configured to implement all functions of the foregoing function units.

The bus may be an industry standard architecture (ISA) bus, a Peripheral Component Interconnect (PCI) bus, an extended industry standard architecture (EISA) bus, or the like. The bus may be classified into an address bus, a data bus, a control bus, and the like. For ease of denotation, the bus is represented by using only one thick line in FIG. 11, but it does not indicate that there is only one bus or one type of bus.

The communications interface 54 may be specifically a communications port integrating transmitting and receiving functions (for example, an antenna).

Further, this embodiment of the present disclosure provides a readable medium including a computer executable instruction. When a processor of the control plane gateway executes the computer executable instruction, the control plane gateway performs the QoS guarantee method described in this embodiment of the present disclosure.

It should be noted that, for detailed description about some function modules in the control plane gateway provided in this embodiment of the present disclosure, reference may be made to corresponding content in the method embodiment, and details are not described again in this embodiment.

In this solution, the control plane gateway may obtain the QoS parameter, and map the QoS parameter to the QoS guarantee information that is required by the user plane gateway to provide the QoS guarantee for the user equipment; and then may instruct, by interacting with the user plane gateway, the user plane gateway to provide the QoS guarantee for the user equipment according to the QoS guarantee information. That is, corresponding QoS guarantee may be provided for the user equipment by using this solution. In addition, an updating process of a mapping relationship configured on the control plane gateway may be simplified when a mapping relationship between the QoS parameter and the QoS guarantee information changes.

Embodiment 6

Figure 12:
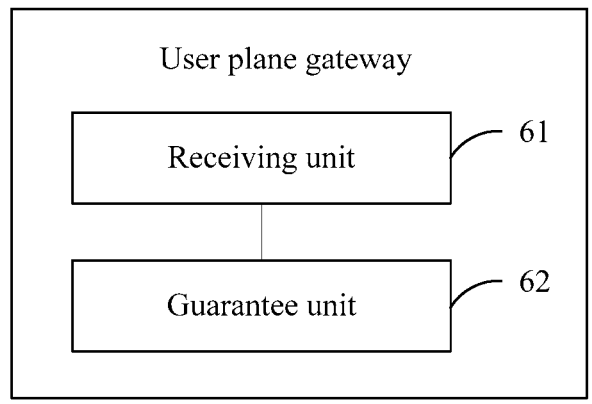
FIG. 12 is a schematic diagram of composition of a user plane gateway according to an embodiment of the present disclosure.

An embodiment of the present disclosure provides a user plane gateway included in an EPC, where the EPC includes a control plane gateway and at least two user plane gateways. As shown in FIG. 12, the user plane gateway includes a receiving unit 61 and a guarantee unit 62.

The receiving unit 61 is configured to receive QoS guarantee information sent by the control plane gateway.

The guarantee unit 62 is configured to provide QoS guarantee for the user equipment according to the QoS guarantee information received by the receiving unit.

In a first application scenario of this embodiment of the present disclosure, the QoS guarantee includes bandwidth guarantee, and the bandwidth guarantee includes session-level bandwidth guarantee, bearer-level bandwidth guarantee, and service-flow-level bandwidth guarantee.

In a second application scenario of this embodiment of the present disclosure, the QoS guarantee may include QoS re-marking, and the QoS re-marking includes bearer-level QoS re-marking and service-flow-level QoS re-marking.

In a third application scenario of this embodiment of the present disclosure, the QoS guarantee may include bearer-level tunnel marking.

It should be noted that, for detailed description about the QoS guarantee information in this embodiment, refer to related description in the method embodiment of the present disclosure, and details are not described herein again.

Further, when the QoS guarantee is the QoS re-marking, the QoS guarantee information is a DSCP parameter.

In this case, the guarantee unit 62 is specifically configured to: when uplink data or downlink data is being forwarded, modify a DSCP field of an IP packet to the DSCP parameter.

Further, when the QoS guarantee is the bearer-level tunnel marking, the guarantee unit 62 is specifically configured to:

when an uplink packet leaves a general packet radio service GPRS tunneling protocol GTP tunnel, decapsulate the uplink packet to extract an outer-layer packet DSCP of the uplink packet, and write the outer-layer packet DSCP of the uplink packet into a packet header of an inner-layer packet of the uplink packet;

when the uplink packet enters a tunnel on a packet data network PDN side, extract an inner-layer packet DSCP of the uplink packet, and write the inner-layer packet DSCP of the uplink packet into a packet header of an outer-layer packet of the uplink packet;

when a downlink packet leaves the tunnel on the PDN side, decapsulate the downlink packet to extract an outer-layer packet DSCP of the downlink packet, and write the outer-layer packet DSCP of the downlink packet into a packet header of an inner-layer packet of the downlink packet; and when the downlink packet enters the GTP tunnel, extract an inner-layer packet DSCP of the downlink packet, and write the inner-layer packet DSCP of the downlink packet into a packet header of the outer-layer packet of the downlink packet.

It should be noted that, for detailed description about some function modules in the user plane gateway provided in this embodiment of the present disclosure, reference may be made to corresponding content in the method embodiment, and details are not described again in this embodiment.

In this solution, the user plane gateway may provide the QoS guarantee for the user equipment according to the QoS guarantee information sent by the control plane gateway. That is, corresponding QoS guarantee may be provided for the user equipment by using this solution. In addition, an updating process of a mapping relationship configured on the control plane gateway may be simplified when a mapping relationship between the QoS parameter and the QoS guarantee information changes.

Embodiment 7

Figure 13:
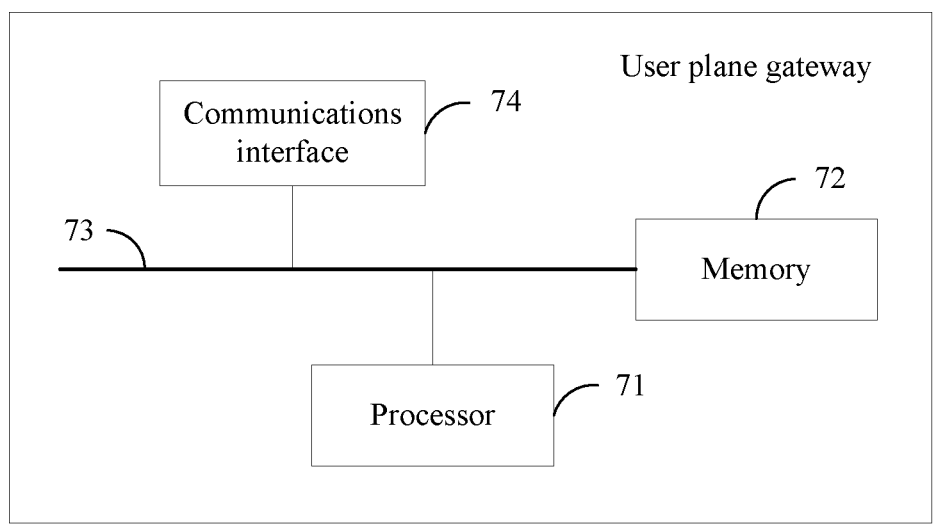
FIG. 13 is a schematic diagram of composition of another user plane gateway according to an embodiment of the present disclosure.

An embodiment of the present disclosure provides a user plane gateway included in an EPC, where the EPC includes a control plane gateway and at least two user plane gateways. As shown in FIG. 13, the control plane gateway includes a processor 71, a memory 72, a system bus 73, and a communications interface 74.

The memory 72 is configured to store a computer executable instruction. The memory 72 is a computer storage medium of the user plane gateway. The computer storage medium may include a high-speed RAM memory, and may further include an NVM, for example, at least one magnetic disk memory. This embodiment of the present disclosure further provides a readable medium including the foregoing computer executable instruction.

The processor 71 may be a CPU, or an ASIC, or one or more integrated circuits configured to implement this embodiment of the present disclosure.

The processor 71 is connected to the memory 72 by using the system bus 73. When the user plane gateway runs, the processor 71 executes the computer executable instruction stored in the memory 72, so that the user plane gateway performs the QoS guarantee method described in the foregoing embodiment.

The communications interface 74 may be specifically a communications port integrating transmitting and receiving functions (for example, an antenna).

It should be noted that, for detailed description about some function modules in the user plane gateway provided in this embodiment of the present disclosure, reference may be made to corresponding content in the method embodiment, and details are not described again in this embodiment.

Further, this embodiment of the present disclosure provides a readable medium including a computer executable instruction. When a processor of the user plane gateway executes the computer executable instruction, the user plane gateway performs the QoS guarantee method described in this embodiment of the present disclosure.

It should be noted that, for detailed description about some function modules in the user plane gateway provided in this embodiment of the present disclosure, reference may be made to corresponding content in the method embodiment, and details are not described again in this embodiment.

In this solution, the user plane gateway may provide the QoS guarantee for the user equipment according to the QoS guarantee information sent by the control plane gateway. That is, corresponding QoS guarantee may be provided for the user equipment by using this solution. In addition, an updating process of a mapping relationship configured on the control plane gateway may be simplified when a mapping relationship between the QoS parameter and the QoS guarantee information changes.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the multiple embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A quality of service (QoS) guarantee method, comprising:
   obtaining, by a control plane gateway, a QoS parameter, wherein the QoS parameter comprises a maximum bit rate (MBR) or a guaranteed bit rate (GBR), and a per access point name aggregate maximum bit rate (APN-AMBR);
   mapping, by the control plane gateway, the QoS parameter to QoS guarantee information, wherein the QoS guarantee information comprises a bandwidth guarantee parameter; and
   sending, by the control plane gateway, the QoS guarantee information to a user plane gateway, wherein the QoS guarantee information is to be used by the user plane gateway to provide QoS guarantee for a user equipment, and wherein the QoS guarantee for the user equipment comprises bandwidth guarantee for the user equipment, and wherein the bandwidth guarantee for the user equipment comprises session-level bandwidth guarantee for the user equipment, bearer-level bandwidth guarantee for the user equipment, and service-flow-level bandwidth guarantee for the user equipment.

2. The method according to claim 1, wherein the bandwidth guarantee parameter comprises a traffic policing parameter or a traffic shaping parameter, wherein the traffic policing parameter comprises a committed information rate (CIR), a committed burst size (CBS), a peak information rate (PIR), and a peak burst size (PBS); and wherein the traffic shaping parameter comprises a rate and a queue depth, the rate represents a preset maximum allowed rate of packet transmission, and the queue depth represents a maximum quantity of packets that can be buffered by the user equipment.

3. The method according to claim 1, wherein the bandwidth guarantee parameter comprises feature information indicating a feature of a packet on which the bandwidth guarantee for the user equipment is to be performed.

4. The method according to claim 3, wherein the feature information further comprises an Internet Protocol (IP) address of the user equipment or a tunnel endpoint identifier (TEID), and wherein the bandwidth guarantee parameter is used to instruct the user plane gateway to perform the bandwidth guarantee for the user equipment on a packet including the IP address of the user equipment and the TEID.

5. The method according to claim 3, wherein the feature information further comprises an Internet Protocol (IP) address of the user equipment and a traffic flow template (TFT), and is used to instruct the user plane gateway to perform the bandwidth guarantee on a packet including the IP address of the user equipment and the TFT.

6. The method according to claim 2, wherein the mapping, by the control plane gateway, the QoS parameter to QoS guarantee information comprises mapping, by the control plane gateway, the GBR to the CIR and the CBS, and mapping the APN-AMBR to the PIR and the PBS; or mapping, by the control plane gateway, the MBR to the rate and the queue depth.

7. A control plane gateway, comprising:
at least one processor, the at least one processor configured to:
obtain a QoS parameter, wherein the QoS parameter comprises a maximum bit rate (MBR) or a guaranteed bit rate (GBR), and a per access point name aggregate maximum bit rate (APN-AMBR); and
map the QoS parameter to QoS guarantee information, wherein the QoS guarantee information comprises a bandwidth guarantee parameter; and
a transmitter, the transmitter configured to send the QoS guarantee information to a user plane gateway, wherein the QoS guarantee information is to be used by the user plane gateway to provide QoS guarantee for a user equipment, and wherein the QoS guarantee for the user equipment comprises bandwidth guarantee for the user equipment, and wherein the bandwidth guarantee for the user equipment comprises session-level bandwidth guarantee for the user equipment, bearer-level bandwidth guarantee for the user equipment, and service-flow-level bandwidth guarantee for the user equipment.

8. The control plane gateway according to claim 7, wherein the bandwidth guarantee parameter comprises a traffic policing parameter or a traffic shaping parameter, wherein the traffic policing parameter comprises a committed information rate (CIR), a committed burst size (CBS), a peak information rate (PIR), and a peak burst size (PBS); and wherein the traffic shaping parameter comprises a rate and a queue depth, the rate represents a preset maximum allowed rate of packet transmission, and the queue depth represents a maximum quantity of packets that can be buffered by the user equipment.

9. The control plane gateway according to claim 7, wherein the bandwidth guarantee parameter comprises feature information indicating a feature of a packet on which the bandwidth guarantee for the user equipment is to be performed.

10. The control plane gateway according to claim 9, wherein the feature information further comprises an Internet Protocol (IP) address of the user equipment or a tunnel endpoint identifier (TEID), and wherein the bandwidth guarantee parameter is used to instruct the user plane gateway to perform the bandwidth guarantee for the user equipment on a packet including the IP address of the user equipment and the TEID.

11. The control plane gateway according to claim 9, wherein the feature information further comprises an Internet Protocol (IP) address of the user equipment and a traffic flow template (TFT), and is used to instruct the user plane gateway to perform the bandwidth guarantee on a packet including the IP address of the user equipment and the TFT.

12. The control plane gateway according to claim 7, further comprising:
a memory, the memory configured to store a mapping relationship between the QoS parameter and the QoS guarantee information.

13. A non-transitory computer-readable storage medium comprising instructions which, when executed by one or more processors of a control plane gateway, cause the one or more processors to perform operations of:
obtaining a QoS parameter, wherein the QoS parameter comprises a maximum bit rate (MBR) or a guaranteed bit rate (GBR), and a per access point name aggregate maximum bit rate (APN-AMBR);
mapping, by the control plane gateway, the QoS parameter to QoS guarantee information, wherein the QoS guarantee information comprises a bandwidth guarantee parameter; and
sending, by the control plane gateway, the QoS guarantee information to a user plane gateway, wherein the QoS guarantee information is to be used by the user plane gateway to provide QoS guarantee for a user equipment, and wherein the QoS guarantee for the user equipment comprises bandwidth guarantee for the user equipment, and wherein the bandwidth guarantee for the user equipment comprises session-level bandwidth guarantee for the user equipment, bearer-level bandwidth guarantee for the user equipment, and service-flow-level bandwidth guarantee for the user equipment.

14. The non-transitory computer-readable storage medium according to claim 13, wherein the bandwidth guarantee parameter comprises a traffic policing parameter or a traffic shaping parameter, wherein the traffic policing parameter comprises a committed information rate (CIR), a committed burst size (CBS), a peak information rate (PIR), and a peak burst size (PBS); and wherein the traffic shaping parameter comprises a rate and a queue depth, the rate represents a preset maximum allowed rate of packet transmission, and the queue depth represents a maximum quantity of packets that can be buffered by the user equipment.

15. The non-transitory computer-readable storage medium according to claim 13, wherein the bandwidth guarantee parameter comprises feature information indicating a feature of a packet on which the bandwidth guarantee for the user equipment is to be performed.

16. The non-transitory computer-readable storage medium according to claim 15, wherein the feature information further comprises an Internet Protocol (IP) address of the user equipment or a tunnel endpoint identifier (TEID), and wherein the bandwidth guarantee parameter is used to instruct the user plane gateway to perform the bandwidth guarantee for the user equipment on a packet including the IP address of the user equipment and the TEID.

17. The non-transitory computer-readable storage medium according to claim 15, wherein the feature information further comprises an Internet Protocol (IP) address of the user equipment and a traffic flow template (TFT), and is used to instruct the user plane gateway to perform the bandwidth guarantee on a packet including the IP address of the user equipment and the TFT.

18. The non-transitory computer-readable storage medium according to claim 14, wherein the mapping, by the control plane gateway, the QoS parameter to QoS guarantee information comprises mapping, by the control plane gateway, the GBR to the CIR and the CBS, and mapping the APN-AMBR to the PIR and the PBS; or mapping, by the control plane gateway, the MBR to the rate and the queue depth.

* * * * *